United States Patent
Burdea et al.

(10) Patent No.: US 9,868,012 B2
(45) Date of Patent: Jan. 16, 2018

(54) REHABILITATION SYSTEMS AND METHODS

(71) Applicant: Bright Cloud International Corp., Highland Park, NJ (US)

(72) Inventors: Grigore C. Burdea, Highland Park, NJ (US); Amine Arezki, Paris (FR); Mourad Bouzit, Ormoy (FR); Daniel Cioi, Piscataway, NJ (US); Manjuladevi Kuttuva, San Diego, CA (US); David Fensterheim, Cambridge, MA (US)

(73) Assignee: Bright Cloud International Corp., Highland Park, NJ (US)

( * ) Notice: Subject to any disclaimer, the term of this patent is extended or adjusted under 35 U.S.C. 154(b) by 0 days.

(21) Appl. No.: 14/575,519

(22) Filed: Dec. 18, 2014

(65) Prior Publication Data

US 2015/0105222 A1   Apr. 16, 2015

Related U.S. Application Data

(63) Continuation of application No. 12/192,818, filed on Aug. 15, 2008, now abandoned.
(Continued)

(51) Int. Cl.
A63B 21/00 (2006.01)
A63B 24/00 (2006.01)
(Continued)

(52) U.S. Cl.
CPC ........ *A63B 21/00101* (2013.01); *A63B 21/06* (2013.01); *A63B 21/4017* (2015.10);
(Continued)

(58) Field of Classification Search
USPC ............ 600/595, 585, 586, 587; 601/23, 33; 482/6, 8
See application file for complete search history.

(56) References Cited

U.S. PATENT DOCUMENTS 4,002,165 A * 1/1977 Lind .................... A61G 13/009
602/33
4,337,050 A * 6/1982 Engalitcheff, Jr. .. A63B 21/015
434/219
(Continued)

OTHER PUBLICATIONS

Burdea et al., The Rutgers Arm II Rehabilitation System, Jul. 23, 2008.
(Continued)

*Primary Examiner* — Nikolai A Gishnock
(74) *Attorney, Agent, or Firm* — McCarter & English, LLP

(57) ABSTRACT

The present invention integrates an actuated tilting rehabilitation table, video tracking of the patient arm and opposite shoulder, a low-friction forearm support with grasping force sensing, remote data transmission and additional weighing means, one or more large displays, a computer and a plurality of simulation exercises, such as video games. The patient can be monitored by a local or remote clinician. The table tilts in order to increase exercise difficulty due to gravity loading on the patient's arm and shoulder. In one embodiment, the present the invention includes an actuated tilting table which tilts in four degrees of freedom.

20 Claims, 20 Drawing Sheets

Related U.S. Application Data

(60) Provisional application No. 60/964,861, filed on Aug. 15, 2007.

(51) Int. Cl.

| | | |
|---|---|---|
| G10L 15/22 | (2006.01) | |
| H04L 29/06 | (2006.01) | |
| G06F 17/30 | (2006.01) | |
| H04M 7/00 | (2006.01) | |
| H04M 3/56 | (2006.01) | |
| A63B 21/06 | (2006.01) | |
| A63B 23/12 | (2006.01) | |
| A63B 71/06 | (2006.01) | |
| A63B 60/46 | (2015.01) | |
| A63B 23/035 | (2006.01) | |
| A63B 22/00 | (2006.01) | |

(52) U.S. Cl.
CPC ...... *A63B 21/4035* (2015.10); *A63B 21/4047* (2015.10); *A63B 23/12* (2013.01); *A63B 24/0003* (2013.01); *A63B 24/0006* (2013.01); *A63B 24/0021* (2013.01); *A63B 71/0622* (2013.01); *G06F 17/30699* (2013.01); *G10L 15/22* (2013.01); *H04L 65/403* (2013.01); *H04L 65/4023* (2013.01); *H04M 3/56* (2013.01); *H04M 7/0024* (2013.01); *A63B 23/03525* (2013.01); *A63B 2022/0092* (2013.01); *A63B 2024/0009* (2013.01); *A63B 2024/0015* (2013.01); *A63B 2060/464* (2015.10); *A63B 2071/065* (2013.01); *A63B 2071/0647* (2013.01); *A63B 2209/10* (2013.01); *A63B 2220/13* (2013.01); *A63B 2220/51* (2013.01); *A63B 2220/56* (2013.01); *A63B 2220/806* (2013.01); *A63B 2225/15* (2013.01); *A63B 2225/20* (2013.01); *A63B 2225/50* (2013.01); *G06F 2203/011* (2013.01)

(56) References Cited

U.S. PATENT DOCUMENTS

| | | | | |
|---|---|---|---|---|
| 4,375,674 A * | 3/1983 | Thornton | A61B 5/103 | 273/DIG. 6 |
| 4,471,957 A * | 9/1984 | Engalitcheff, Jr. | A63B 21/015 | 434/219 |
| 4,637,789 A * | 1/1987 | Netznik | B29C 33/308 | 249/112 |
| 4,773,639 A * | 9/1988 | Graves | A47D 13/04 | 297/5 |
| 4,861,051 A * | 8/1989 | Napper | A61H 3/04 | 135/67 |
| 4,885,687 A * | 12/1989 | Carey | A61B 5/225 | 273/440 |
| 4,976,426 A * | 12/1990 | Szabo | A63B 21/00178 | 482/111 |
| 5,186,695 A * | 2/1993 | Mangseth | A63B 21/0058 | 434/247 |
| 5,241,952 A * | 9/1993 | Ortiz | A63B 23/12 | 434/261 |
| 5,265,589 A * | 11/1993 | Wang | A63B 23/00 | 434/258 |
| 5,350,304 A * | 9/1994 | Fula | G09B 19/00 | 312/213 |
| 5,435,728 A * | 7/1995 | Fula | G09B 19/00 | 312/213 |
| 5,466,213 A * | 11/1995 | Hogan | A61H 1/02 | 482/4 |
| 5,518,475 A * | 5/1996 | Garland | A47D 13/043 | 482/66 |
| 5,692,517 A * | 12/1997 | Junker | A61B 5/0482 | 128/905 |
| 5,700,201 A * | 12/1997 | Bellows | A47D 13/107 | 297/137 |
| 5,728,030 A * | 3/1998 | Hsieh | A47D 13/043 | 472/15 |
| 5,827,072 A * | 10/1998 | Neufer | A63B 69/002 | 434/247 |
| 5,846,086 A * | 12/1998 | Bizzi | A63B 24/0006 | 434/247 |
| 5,913,749 A * | 6/1999 | Harmon | A63B 1/00 | 482/129 |
| 5,954,621 A * | 9/1999 | Joutras | A43B 1/0054 | 482/114 |
| 5,976,063 A * | 11/1999 | Joutras | A43B 1/0054 | 482/114 |
| 5,980,435 A * | 11/1999 | Joutras | A43B 1/0054 | 482/114 |
| 5,986,224 A * | 11/1999 | Kent | G06F 3/0418 | 178/18.01 |
| 6,162,189 A * | 12/2000 | Girone | A61B 5/1036 | 482/79 |
| 6,302,037 B1 * | 10/2001 | Del Frari | A47B 13/12 | 108/147.19 |
| 6,413,190 B1 * | 7/2002 | Wood | A61B 5/1071 | 463/36 |
| 6,416,447 B1 * | 7/2002 | Harmon | A63B 21/0023 | 482/121 |
| 6,592,315 B2 * | 7/2003 | Osborne, Jr. | A47G 21/08 | 414/730 |
| 6,613,000 B1 * | 9/2003 | Reinkensmeyer | A61B 5/221 | 600/587 |
| 6,682,139 B2 * | 1/2004 | Bellows | A47D 1/008 | 297/136 |
| 6,685,480 B2 * | 2/2004 | Nishimoto | G09B 19/0015 | 434/247 |
| 6,749,432 B2 * | 6/2004 | French | A61B 5/1113 | 434/247 |
| 6,817,864 B1 * | 11/2004 | Martinez | A47D 1/008 | 434/258 |
| 7,204,814 B2 * | 4/2007 | Peles | A61H 1/0277 | 601/33 |
| 7,252,644 B2 * | 8/2007 | Dewald | A61H 1/02 | 601/23 |
| 7,257,237 B1 | 8/2007 | Luck et al. | | |
| 7,394,459 B2 * | 7/2008 | Bathiche | A63F 13/00 | 345/156 |
| 7,401,783 B2 | 7/2008 | Pryor | | |
| 7,452,336 B2 * | 11/2008 | Thompson | A61B 5/162 | 351/203 |
| 7,476,102 B2 * | 1/2009 | Maples | A61F 5/013 | 434/247 |
| 7,523,984 B2 * | 4/2009 | Steininger | A47D 1/008 | 280/87.05 |
| 7,525,538 B2 * | 4/2009 | Bathiche | G02B 5/282 | 345/175 |
| 7,648,473 B1 * | 1/2010 | Peruvingal | A61F 5/3776 | 5/613 |
| 7,725,175 B2 * | 5/2010 | Koeneman | A61H 1/02 | 600/546 |
| 7,856,264 B2 * | 12/2010 | Firlik | A61M 5/14276 | 607/3 |
| 7,880,717 B2 * | 2/2011 | Berkley | G06F 3/016 | 318/560 |
| 7,907,128 B2 * | 3/2011 | Bathiche | A63F 13/00 | 345/173 |
| 8,012,108 B2 * | 9/2011 | Bonutti | A61F 5/0102 | 601/33 |
| 9,351,857 B2 * | 5/2016 | Carignan | A61F 2/468 | |
| 2002/0103429 A1 * | 8/2002 | deCharms | A61B 5/055 | 600/410 |
| 2002/0143277 A1 * | 10/2002 | Wood | A61B 5/1071 | 600/595 |
| 2002/0169058 A1 * | 11/2002 | Harmon | A63B 21/0023 | 482/142 |
| 2003/0028130 A1 * | 2/2003 | Wunderly | A61H 1/0274 | 601/5 |

(56) References Cited

U.S. PATENT DOCUMENTS

| | | | |
|---|---|---|---|
| 2003/0120183 A1* | 6/2003 | Simmons | A61F 4/00 600/595 |
| 2004/0006287 A1* | 1/2004 | Epley | A61B 5/11 600/595 |
| 2005/0091749 A1* | 5/2005 | Humbles | A61G 13/1235 5/646 |
| 2005/0167907 A1* | 8/2005 | Curkendall | A63B 24/0021 273/108 |
| 2005/0181347 A1* | 8/2005 | Barnes | G09B 19/06 434/350 |
| 2005/0187071 A1* | 8/2005 | Yamashita | A41D 13/1236 482/1 |
| 2005/0216243 A1* | 9/2005 | Graham | G06F 19/3437 703/11 |
| 2005/0283053 A1* | 12/2005 | deCharms | A61B 5/055 600/300 |
| 2006/0001296 A1* | 1/2006 | Riach | A61G 7/16 297/68 |
| 2006/0003877 A1* | 1/2006 | Harmon | A63B 21/0023 482/142 |
| 2006/0161218 A1* | 7/2006 | Danilov | A61B 5/0492 607/45 |
| 2006/0195018 A1* | 8/2006 | Guillen | A61B 5/162 600/300 |
| 2006/0241718 A1* | 10/2006 | Tyler | A61B 5/0492 607/45 |
| 2006/0293617 A1* | 12/2006 | Einav | A61H 1/0274 601/33 |
| 2007/0003915 A1* | 1/2007 | Templeman | G06T 13/40 434/247 |
| 2007/0043308 A1* | 2/2007 | Lee | A61H 1/0237 601/34 |
| 2007/0060445 A1* | 3/2007 | Reinkensmeyer | A61H 1/0274 482/1 |
| 2007/0060849 A1* | 3/2007 | Bluman | A61H 1/0274 601/33 |
| 2007/0066918 A1* | 3/2007 | Dewald | A61H 1/02 601/5 |
| 2007/0100214 A1* | 5/2007 | Steinert | A61H 1/00 600/300 |
| 2007/0191141 A1* | 8/2007 | Weber | A63B 69/0026 473/446 |
| 2007/0250119 A1* | 10/2007 | Tyler | A61N 1/36014 607/2 |
| 2007/0254787 A1* | 11/2007 | Matsubara | A63B 21/0058 482/139 |
| 2007/0282228 A1* | 12/2007 | Einav | A61B 5/7475 601/33 |
| 2008/0004550 A1* | 1/2008 | Einav | A61B 5/7475 601/33 |
| 2008/0009771 A1* | 1/2008 | Perry | B25J 9/0006 600/587 |
| 2008/0009772 A1* | 1/2008 | Tyler | A61B 5/0492 600/595 |
| 2008/0036737 A1 | 2/2008 | Hernandez-Rebollar | |
| 2008/0061949 A1 | 3/2008 | Ferguson et al. | |
| 2008/0132383 A1* | 6/2008 | Einav | A61H 1/02 482/8 |
| 2008/0139975 A1* | 6/2008 | Einav | A61H 1/0262 601/33 |
| 2008/0242521 A1* | 10/2008 | Einav | A61B 5/1116 482/110 |
| 2008/0319349 A1* | 12/2008 | Zilberman | A61B 5/0031 600/587 |
| 2009/0023122 A1* | 1/2009 | Lieberman | G09B 19/003 434/258 |
| 2009/0062698 A1* | 3/2009 | Einav | A61B 5/7475 601/5 |
| 2009/0091229 A1* | 4/2009 | Karl | A47C 16/02 312/351.1 |
| 2009/0227888 A1* | 9/2009 | Salmi | A61B 5/1118 600/534 |
| 2009/0233769 A1* | 9/2009 | Pryor | B60K 35/00 482/8 |
| 2009/0305207 A1* | 12/2009 | Ueshima | A63B 24/0003 434/258 |
| 2010/0016766 A1* | 1/2010 | Zhang | A61F 5/0102 601/5 |
| 2010/0068686 A1* | 3/2010 | Ueshima | A63F 13/00 434/258 |
| 2010/0125033 A1* | 5/2010 | Harmon | A63B 21/0023 482/139 |
| 2010/0179453 A1* | 7/2010 | Schweighofer | A61B 5/1118 600/595 |
| 2010/0182220 A1* | 7/2010 | Bathiche | H04N 13/047 345/7 |
| 2010/0204616 A1* | 8/2010 | Shears | A61B 5/1127 600/595 |
| 2010/0234182 A1* | 9/2010 | Hoffman | A61B 5/1125 482/8 |
| 2010/0271315 A1* | 10/2010 | Bathiche | G06F 3/0202 345/173 |
| 2011/0112441 A1* | 5/2011 | Burdea | A63B 21/06 600/595 |
| 2011/0167563 A1* | 7/2011 | Humbles | A61G 13/1235 5/623 |
| 2011/0319166 A1* | 12/2011 | Bathiche | G02B 27/017 463/40 |
| 2013/0061395 A1* | 3/2013 | Karl | A47C 27/144 5/503.1 |
| 2013/0109549 A1* | 5/2013 | Harmon | A63B 21/0023 482/139 |
| 2015/0099614 A1* | 4/2015 | Tekulve | A63B 69/0064 482/139 |
| 2016/0144229 A1* | 5/2016 | Aluru | A63B 23/16 482/92 |
| 2016/0166451 A1* | 6/2016 | Tekulve | A61G 5/14 297/5 |

OTHER PUBLICATIONS

Chen et al., Aid Training System for Upper Extremity Rehabilitation, 2001 Proceedings of the 23rd Annual EMBS International Conference, Oct. 25-28, 2001.

Dewald et al., Upper-Limb Discoordination in Hemiparetic Stroke: Implications for Neurorehabilitation, Top Stroke Rehabil, 2001; 8(1): 1-12.

Loureiro et al., Robot Aided Therapy: Challenges Ahead for Upper Limb Stroke Rehabilitation, Proc. 5th Intl. Conf. Disability, Virtual Reality & Assoc. Tech., Oxford, UK, 2004.

Colombo G, et al., "Novel tilt table with integrated robotic stepping mechanism: Design principles and clinical application", Proceedings of the 2005 IEEE, 9th International Conference on Rehabilitation Robotics, 2005, pp. 227-230, Chicago, IL.

Colombo R, et al., "Upper limb rehabilitation and evaluation of stroke patients using robot-aided techniques", Proceedings of the 2005 IEEE, 9th Internaitonal Conference on Rehabilitation Robotics, 2005, pp. 515-518, Chicago, IL.

Kim S.H., et al., "An intelligent tilt table for paralytic patients", Biomed 06, IFMBE Proceedings, 2007, vol. 15, pp. 615-617, Springer-Verlan, Berlin.

Kuttuva M, et al., "The Rutgers Arm: An upper-extremity rehabilitation system in virtual reality", Fourth Int. Workshop on Virtual Rehabilitation, 2005, pp. 1-8, Catalina Island, CA.

* cited by examiner

REHABILITATION SYSTEMS AND METHODS

BACKGROUND OF THE INVENTION

1. Field of the Invention

The present invention is a device, system and method for providing rehabilitation to several types of patients in a rehabilitation hospital or outpatient clinic. The approach integrates an actuated tilting rehabilitation table, video tracking of the patient's arm and opposite shoulder, a low-friction forearm support with grasping force sensing, remote data transmission and additional weighing means, one or more large displays, a computer and a plurality of video games.

2. Description of Related Art

A training system for arm rehabilitation is described in Yu-Luen Chen et al, "Aid Training System for Upper Extremity Rehabilitation," 2001 Proceedings of the EMBS International Conference, Istanbul. Turkey. Patients exercise on a special table that incorporates reed relays and a hand support ("arm skate") with small underside wheels. The movement of the arm in the arm skate on the supporting table is detected by the interaction of the magnet incorporated in the arm skate with the relays integrated in the table. A computer presents a variety of patterns on its monitor, which the patient needs to replicate to improve arm coordination, with performance data stored by the computer in a clinical database. The table is horizontal and does not use virtual reality simulations.

Another training system that uses a forearm support on a table for rehabilitation purposes is described by some of the inventors of the present specification in Kutuva et al. "The Rutgers Arm: An Upper-Extremity Rehabilitation System in Virtual Reality," Proceedings of the Fourth International Workshop on Virtual Rehabilitation (IWVR'05), pp. 94-103. Catalina Island, Calif. September 2005. The table has a low-friction surface and a forearm support has a low-friction underside (made of TEFLON® studs). The tracking of the forearm movement is done by a magnetic tracker (Fastrack, Polhemus Inc.), with a sensor mounted on the forearm support, and an emitter mounted on the table away from the patient. Patients exercise sitting at the table and looking at a computer monitor, while playing a plurality of virtual reality games. The games are designed to improve motor coordination, as well as dynamic arm response. The table does not tilt.

Several tilting tables exist commercially and are used in rehabilitation. They are meant for people who have low blood pressure and who get dizzy when they stand up. Tilting tables are also used for the rehabilitation of patients who have to lie down for a long period of time. The person lies face up on a padded table with a footboard and is held in place with a safety belt. The table is tilted so that the angle is very slowly increased until the person is nearly upright. By slowly increasing the angle, the patient's blood vessels regain the ability to constrict.

A study describes development of a sensorized tilt table which measures and displays the knee bent angle and pressure for each foot during exercise in real time, as described in Kimet et al. "An Intelligent Tilt Table for Paralytic Patients," $3^{rd}$ Kuala Lumpur international Conference on Biomedical Engineering, Kuala Lumpur, Malaysia, 2006. It is expected that the patient's exercising effect can increase by monitoring these two values during exercise. Tilt tables are known for providing tilting manually or using an electrical motor, such as in a Rehab Electric Tilt Table manufactured by Cardon Rehab.

An automated stepping training developed with the tilting table is described in Colombo et al. "Novel Stepping Mechanism: Design Principles and Clinical Application." Rehabilitation Robotics. ICORR 2005. Unlike the previous tilting tables it exercises the feet in stepping. No virtual reality simulation is incorporated and tilting is done manually, rather than determined by a simulation.

All of the above tilting-table based systems are for rehabilitation of the legs. The tilting tables described above do not incorporate virtual reality simulations and do not store/upload clinical data automatically. They have a single degree of freedom (the tilting angle).

Systems for rehabilitating the arms are known, and are based on force feedback joysticks (such as those manufactured by Logitech or Microsoft), or various types of planar or 3D robots. Examples of planar robots are the MIT Manus or those described in Colombo et al., "Upper Limb Rehabilitation and Evaluation of Stroke Patients Using Robot-Aided Techniques", Rehabilitation Robotics, 515-518 (2005). Other examples of 3D robots are the Reo robot manufactured by Motorika, N.J., or the Haptic Master manufactured by FCS, Holland.

Other upper limb rehabilitation systems have been described. U.S. Pat. No. 7,204,814 describes an orthotic system that performs predefined or user-controlled limb movements, collects data regarding the limb movement, performs data analysis and displays the data results, modifies operational parameters based on the data to optimize the rehabilitative process performed by the system. A force sensor data, torque data and angular velocity data can be collected using an external actuating device.

U.S. Patent Application Publication No. 2007/0060445 describes a method and apparatus for upper limb rehabilitation training of coordinated arm/forearm, forearm/forearm, and grasping movements comprising a non-robotic, passive support, an arm/forearm sensor, gripping device and sensor. A computer processes measurements of movements to control a graphical representation of the arm/forearm and grasping movements in interaction with a virtual environment.

It is desirable to provide a de, ice, system and method for rehabilitation of an upper limb in which an activated tilting table provides a plurality of degrees of freedom and grasping force is sensing integrated into a video tracking system.

SUMMARY OF THE INVENTION

The present invention integrates an actuated tilting rehabilitation table, video tracking of the patient arm and shoulder, a low-friction forearm support with grasping force sensing, remote data transmission and additional weighing means, one or more large displays, a computer and a plurality of simulation exercises, such as video games. The patient can be monitored by a local or remote clinician. Online storage of data obtained by the rehabilitation tilting table can be provided. Additionally, the table surface can be constructed as a graphics display making a separate display unnecessary.

In one embodiment, a patient's arm rests on a forearm support that has infrared LEDs. The patient wears similar LEDs on the opposite shoulder, and an infrared video camera is used to track the patient's arm movement on the table. The table tilts in order to increase exercise difficulty due to gravity loading on the patient's arm. In one embodiment, the present the invention includes an actuated tilting table which tilts in four degrees of freedom. A large display, facing the patient presents a sequence of rehabilitation games with which the patient interacts by moving the arm resting on the low-friction support, on the table surface.

The invention will be more fully described by reference to the following drawings.

DETAILED DESCRIPTION

Figure 1:
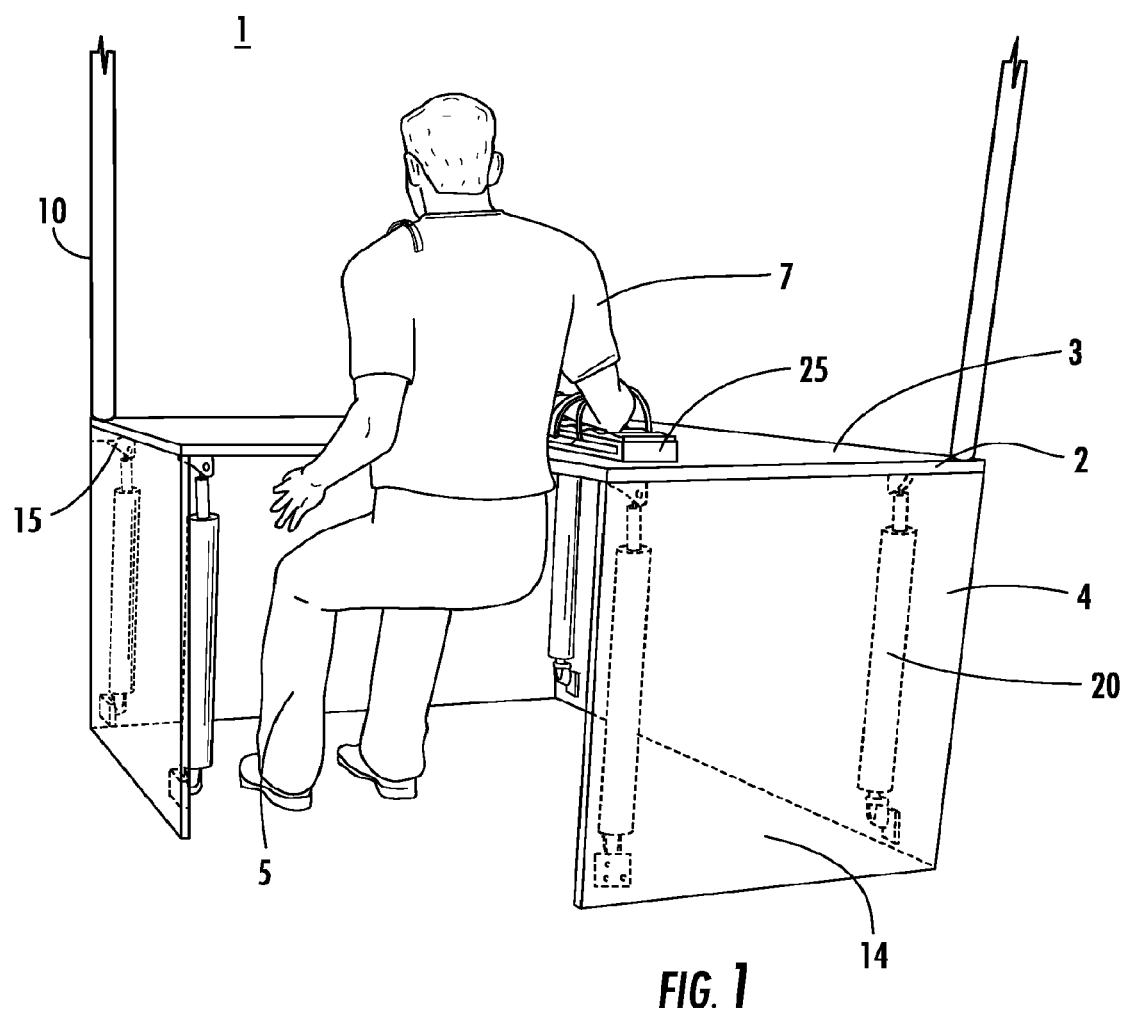
FIG. 1 is a schematic diagram of a tilting rehabilitation table system being used by a patient.

Reference will now be made in greater detail to a preferred embodiment of the invention, an example of which is illustrated in the accompanying drawings. Whenever possible, the same reference numerals will be used throughout the drawings and the description to refer to the same or like parts.

Figure 2:
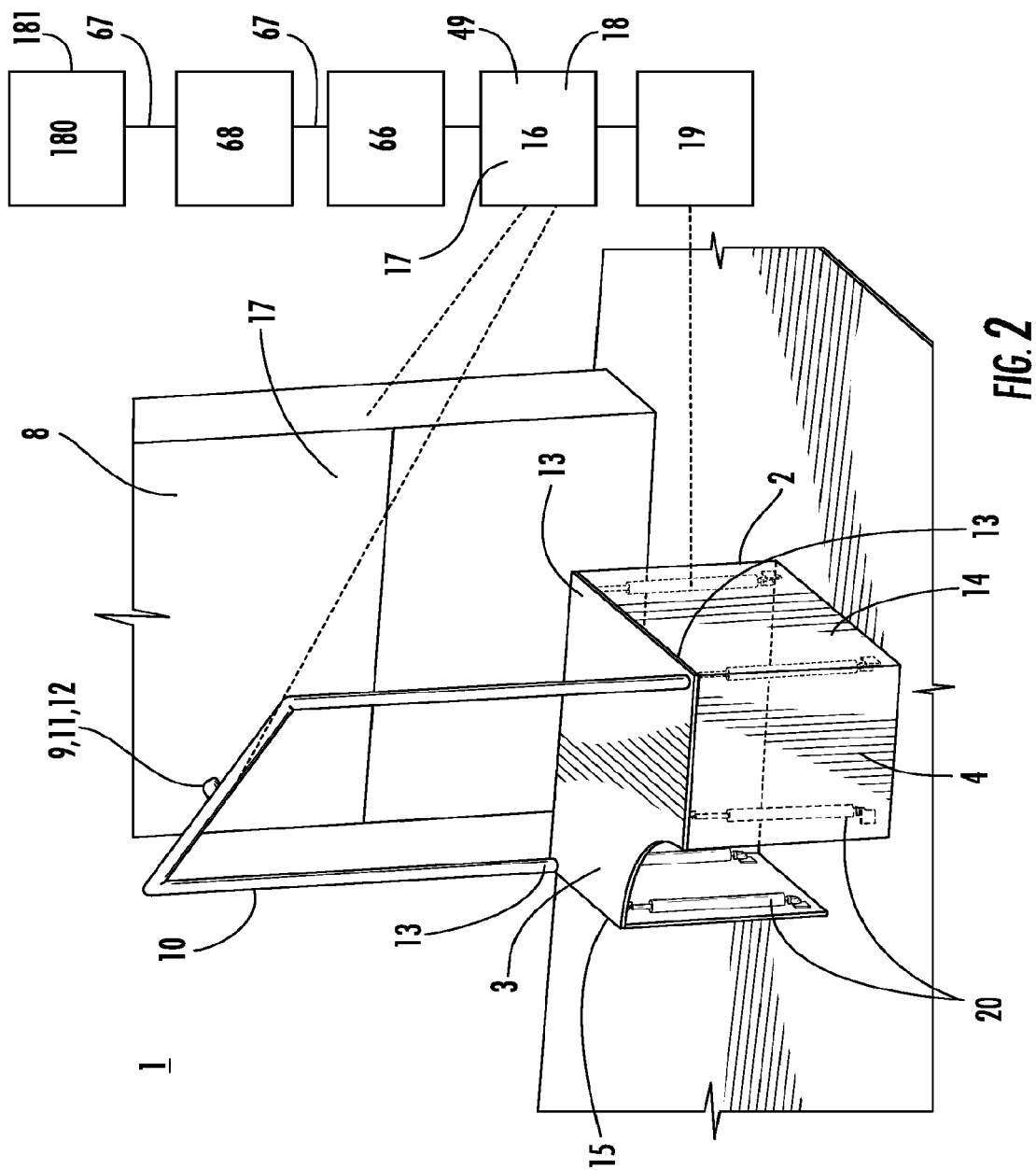
FIG. 2 is a schematic diagram of the tilting rehabilitation table system.

FIGS. 1 and 2 illustrate tilting rehabilitation table system 1. Tilting rehabilitation table system 1 incorporates tilting table 2 which has top surface 3 and underside surface 4. Top surface 3 can be a U-shaped, symmetrical, low-friction surface. Underside surface 4 can have a U-shape. For example, low top surface 3 can be made of carbon fiber, or other durable and light material, covered by a low-friction coating. Suitable low-friction coatings include TEFLON® sheets. Underside walls 14 extend upwardly from underside surface 4.

Patient 5 sits in chair 6 and rests arm 7 to be rehabilitated in low-friction forearm support 25. Patient 5 exercises while watching display 8 placed at the opposite side of tilting table 2. Preferably, display 8 is a large display having dimensions of at least about 9 ft by 6 ft. Video camera 9 is attached to vertical support 10. Vertical support 10 can be U-shaped and rigid. Vertical support 10 extends from and is attached to top surface 3. This arrangement allows video camera 9 to view tilting table 2 and patient 5 simultaneously. Video camera 9 can be a conventional digital camera. Infrared filter 11 can be attached to lens 12 of video camera 9. LEDs 13 are mounted at the corners of top surface 3 and can be wired to direct current source (not shown). For example, three LEDs can be used for providing calibration of video camera 9. Vertical support 10 is mounted to top surface 3 such that it keeps the same relative orientation regardless of tilt angle 15 of top surface 3, thereby making re-calibration of video camera 9 unnecessary once tilt angle 15 changes during a rehabilitation session.

Computer 16 renders exercise simulation 17 and displays them on display 8. For example, exercise simulation 17 can be an animated or virtual reality sequence. Computer 16 is preferably a multi-core PC workstation. Computer 16 also receives input from video camera 9. Computer 16 runs tracking software 18 and communicates with controller 19. Controller 19 activates actuators 20 to provide tilt of top surface 3. Computer 16 is connected to Internet 66 and transparently uploads clinical data 67 to remote clinical database server 68. Remote computer 181 connected to clinical database server 68 over Internet 66 is used to execute remote graphing software 180.

Figure 3:
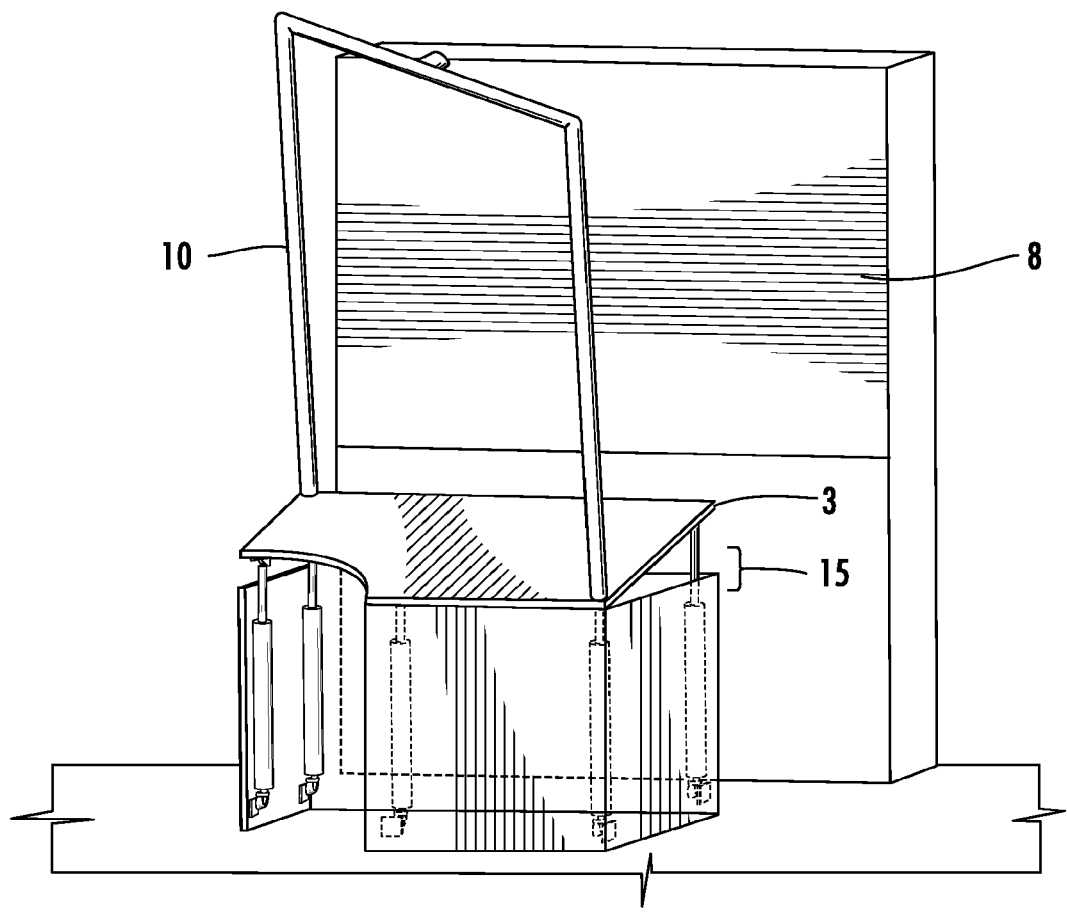
FIG. 3 is a schematic diagram in which a top surface of the tilting table is provided at an increased angle from the patient.

FIG. 3 shows the orientation of top surface 3 and camera support 10 when tilt angle 15 is increased to move the angle away from patient 5. Increased tilt angle 15 makes in/out movements of arm 7 more difficult.

Figure 4:
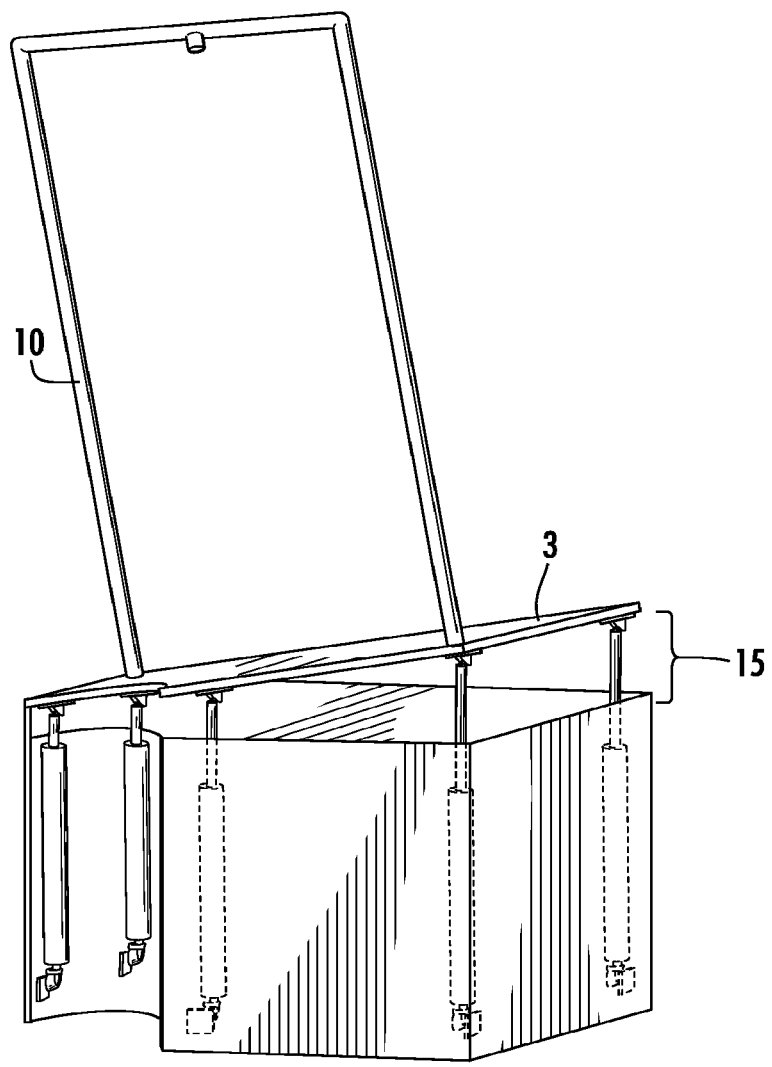
FIG. 4 is a schematic diagram in which the top surface of the tilting table is provided at an increased right angle from the patient.

FIG. 4 shows a different tilt of top surface 3, in which tilt angle 15 is to the right of patient 5. This tilt angle makes arm movements from left-to-right more difficult than those when top surface 3 is horizontal. Other tilt angles 15 can be used when the left side of top surface 3 is tilted up or when the side closer to patient 5 is tilted up. These make more difficult corresponding arm 7 movements, such as right-left or out-in, respectively. In one embodiment, top surface 3 can be tilted in four degrees of freedom.

Figure 5:
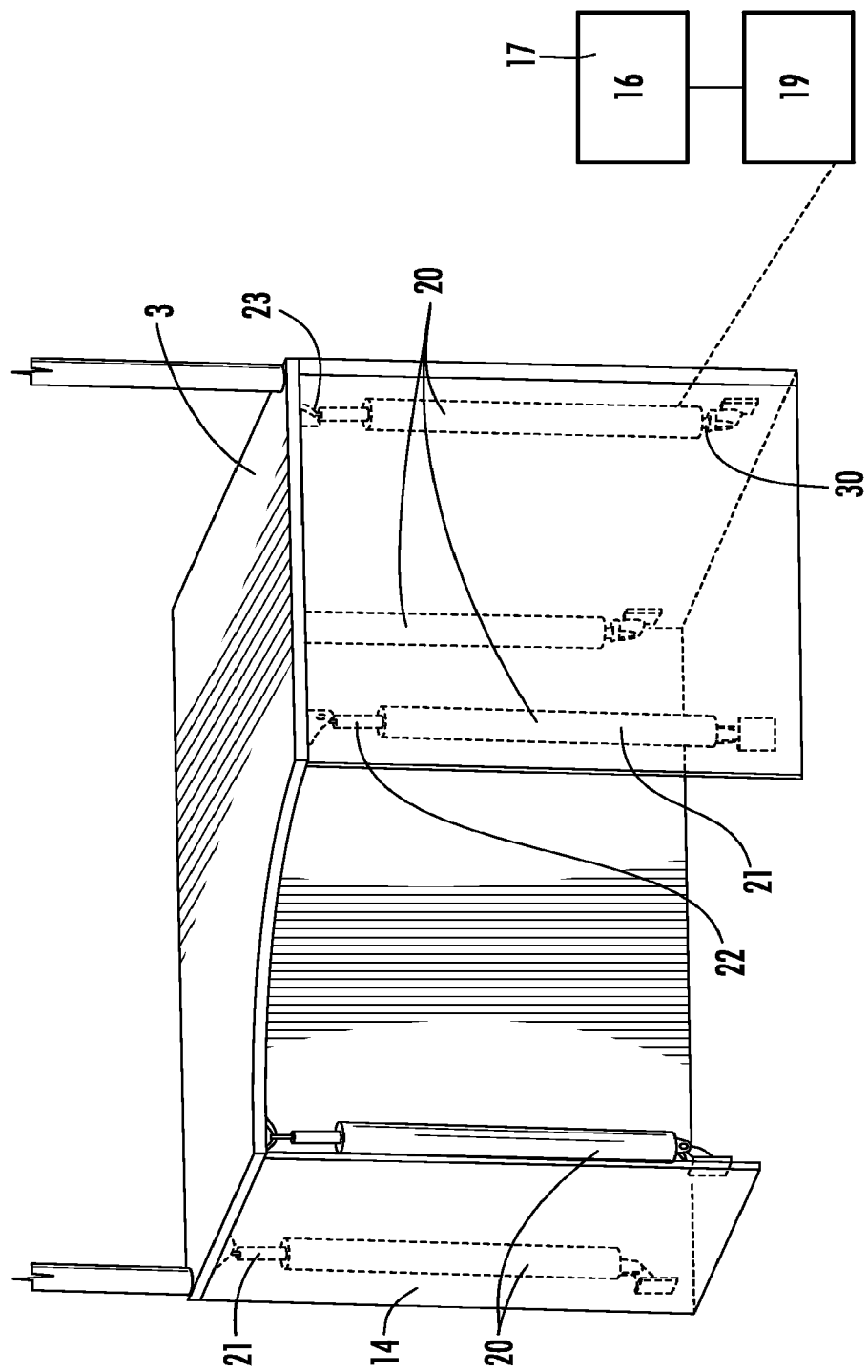
FIG. 5 is a schematic diagram of actuators of the tilting rehabilitation table system used with the tilting table.

Tilt angle 15 is produced by two or more actuators 20 placed under top surface 3, as shown in FIG. 5. Actuators 20 are preferably linear electrical actuators. Actuators 20 are positioned under top surface 3. Each actuator 20 includes base 21 and translating shaft 22. Translating shaft 22 is connected to top surface 3 by top joint assembly 23. Base 21 is connected to underside walls 14 with bottom joint assembly 30. Actuators 20 are controlled by controller 19. Controller 19 can be a multi-channel micro-controller such as those which are available commercially. Controller 19 in turn receives commands from computer 16 running exercise simulation 17. In one embodiment, five actuators 20 can be used and the amount of translation of actuator shaft 22 provides tilt angle 15 which can be varied from about 0 degrees (horizontal) to about 30 degrees. The more top surface 3 is tilted, the larger the effect gravity has due to the weight of arm 7 of patient 5 and of forearm support 25 and the harder exercise simulation 17 is to perform.

Figure 6:
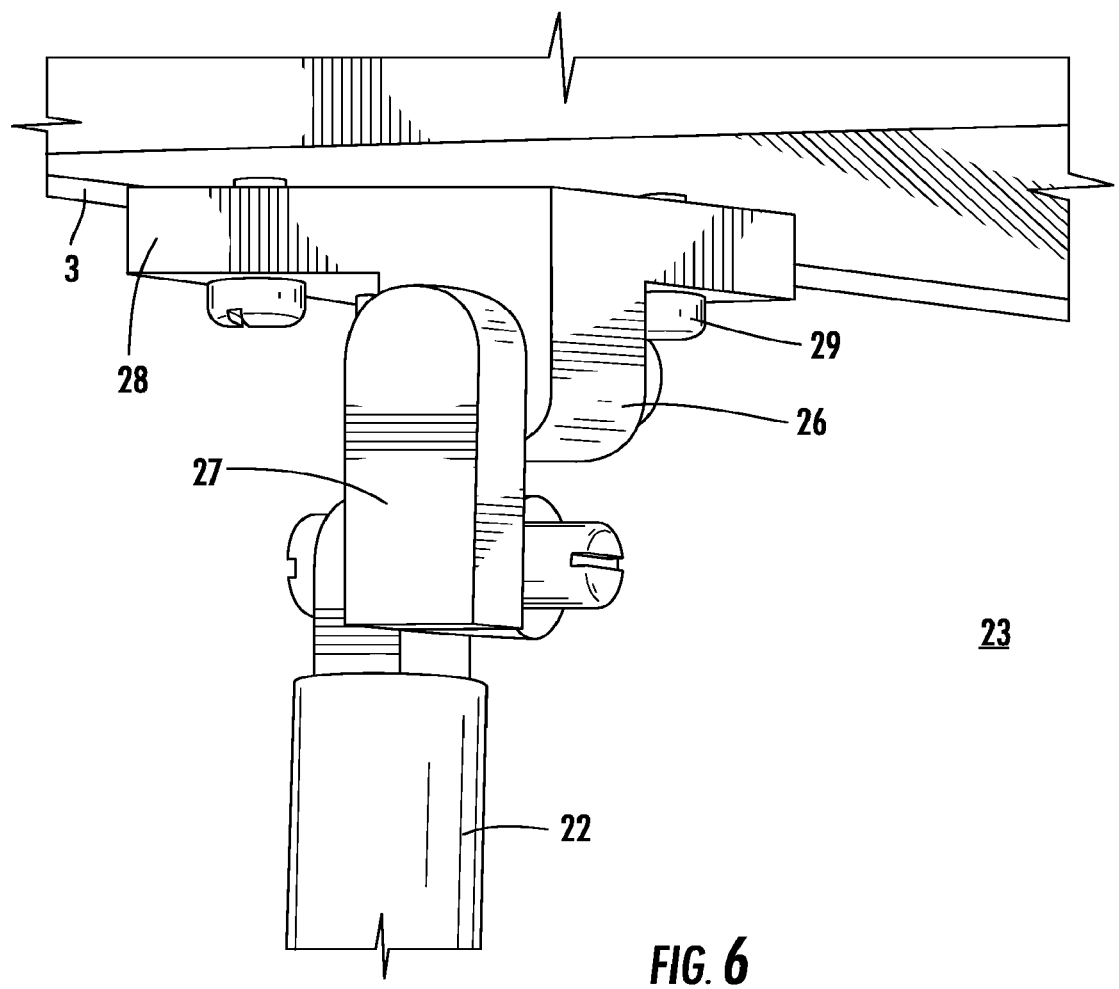
FIG. 6 is a detailed view of a top joint assembly connecting an actuator shaft to the top surface of the tilting table.

FIG. 6 shows a detailed view of top joint assembly 23 which connects actuator shaft 22 to the underside of top surface 3. Top joint assembly 23 has horizontal rotating joint 26 and vertical rotating joint 27 which together produce two degrees of freedom for top joint assembly 23. The axis of rotation of horizontal rotating joint 26 is perpendicular to the axis of rotation of vertical rotating joint 27. Horizontal rotating joint 26 is attached to the underside of top surface 3 using plate 28 and bolts 29.

Figure 7:
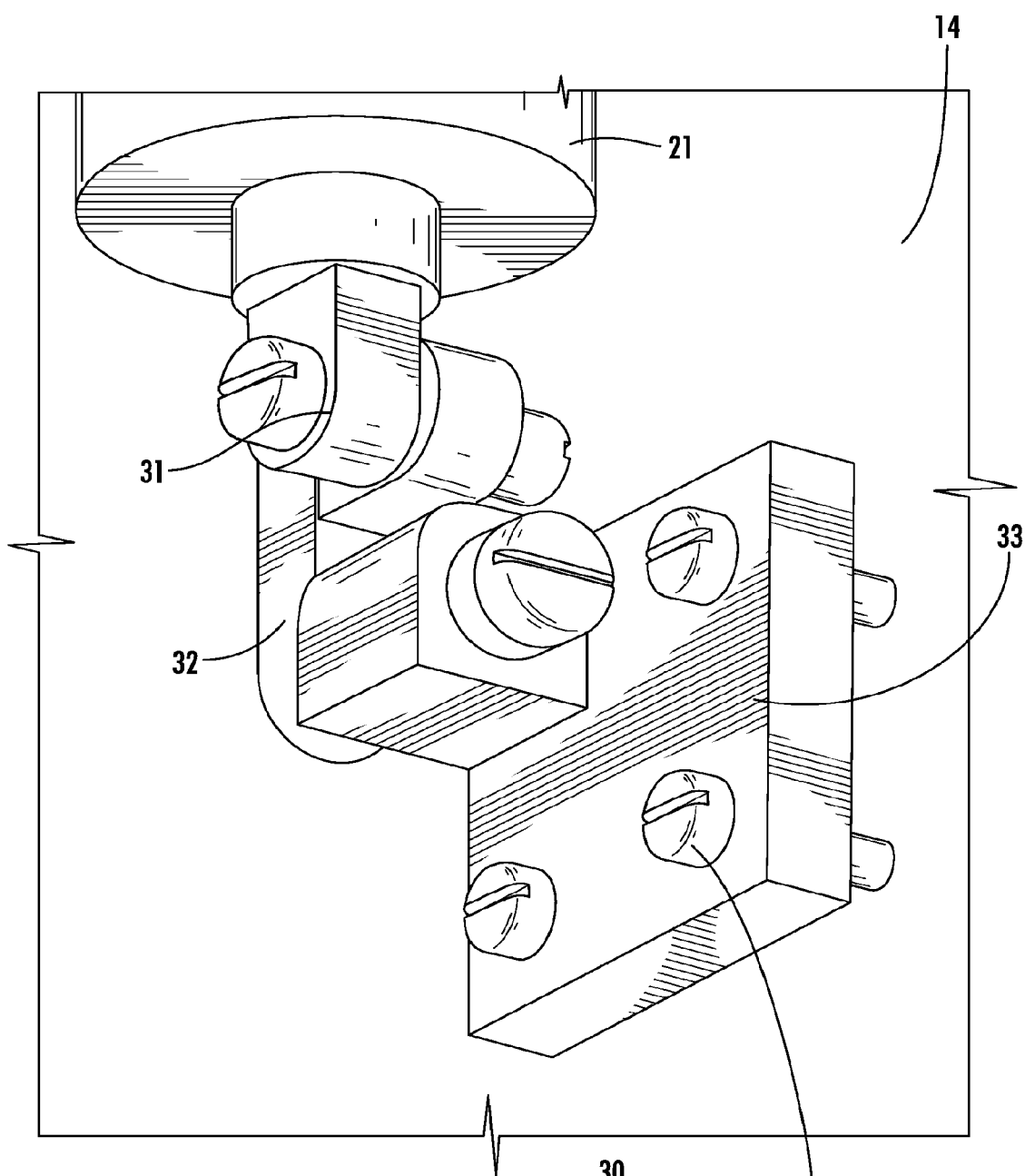
FIG. 7 is a detailed view of a bottom joint assembly connecting an actuator shaft to the bottom surface of the tilting table.

FIG. 7 shows a detailed view of bottom joint assembly 30, which connects base 21 to the inner side of underside walls 14. Bottom joint assembly 30 has horizontal rotating joint 31 and vertical rotating joint 32 which together produce two degrees of freedom for bottom joint assembly 30. The axis of rotation of horizontal rotating joint 31 is perpendicular to the axis of rotation of vertical rotating joint 32. Vertical rotating joint 32 is attached to the inner side of underside walls 14 through plate 33 and bolts 34.

Figure 8:
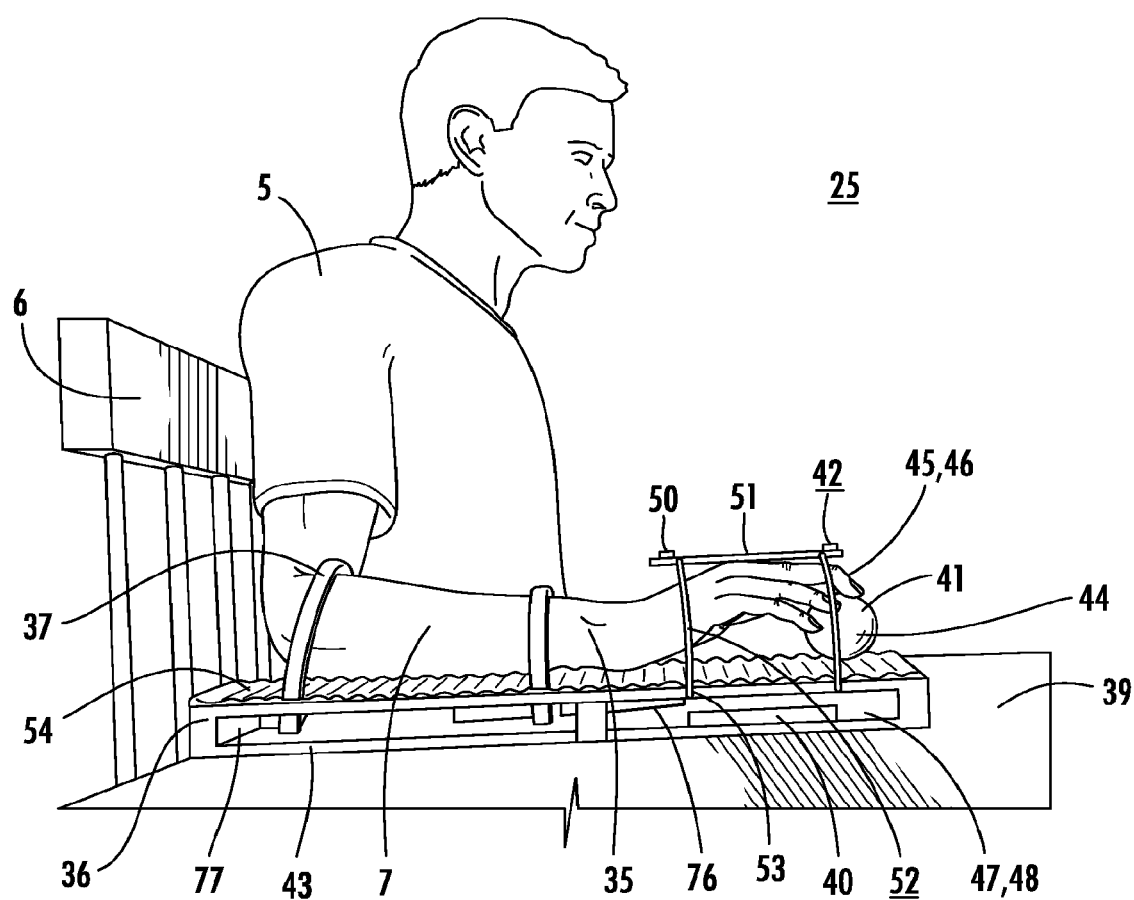
FIG. 8 is a side elevation view of patient wearing the forearm support assembly used in the tilting rehabilitation table system.

A side view of the patient 5 sitting in chair 6 and using of forearm support assembly 25 used by patient 5 is shown in FIG. 8. Forearm 7 and wrist 35 of patient 5 are secured to forearm support base 36 using a plurality of straps 37. For example, straps 37 can be formed of a hook and loop material of VELCRO®. Forearm support base 36 can be made of a lightweight material such as plastic, and is hollow. Pressure sensor 41 measures the air pressure inside hollow compliant element 44. A suitable hollow compliant element 44 can be a rubber ball. Grasping forces 45 exercised by fingers 46 of patient 5 are measured. Video camera 9 shown in FIG. 1 views LED assembly 42 which is formed of two infrared LEDs 50 mounted on plastic support 51 for providing data on arm movements and rotation. LED assembly 42 in turn is mounted on movable assembly 52. Movable assembly 52 rotates on hinges 53 attached to forearm support base 36. Movable assembly 52 rotates open to allow forearm 7 to be placed on forearm support top surface 54. Forearm support top surface 54 is preferably made of a compliant material (such as plastic foam), for increased comfort. Forearm support base 36 has chambers 39, 76 and 77. Chamber 39 can be used to incorporate electronics assembly 40 to which is connected pressure sensor 41. Output of pressure sensor 41 is processed by electronics assembly 40. Electronics assembly 40 includes an analog-to-digital converter 47 and wireless transmitter 48. Transmitter 48 can be a conventional wireless Bluetooth® type transmitter. Transmitter 48 communicates with receiver 49 incorporated in computer 16, as shown in FIG. 2. Computer 16 can change exercise simulation 17 according to grasping forces 45 of patient 5. Computer 16 can also change exercise simulation 17 based on forearm 7 position/orientation given by video camera 9. For example, exercise simulation 17 can be rehabilitation games. LED assembly 42 and electronics assembly 40 are connected to battery 43 in chamber 77. Chamber 76 of base 36 can be used to allow the addition of modular weights 56. The addition of modular weights 56 to forearm support base 36 allows an increased difficulty of exercise simulation 17. The difficulty of performing exercise simulation 17 is increased with the increase in modular weights 56, with the increase in tilting angle 15, and with the number and level of exercise simulation 17.

Figure 9:
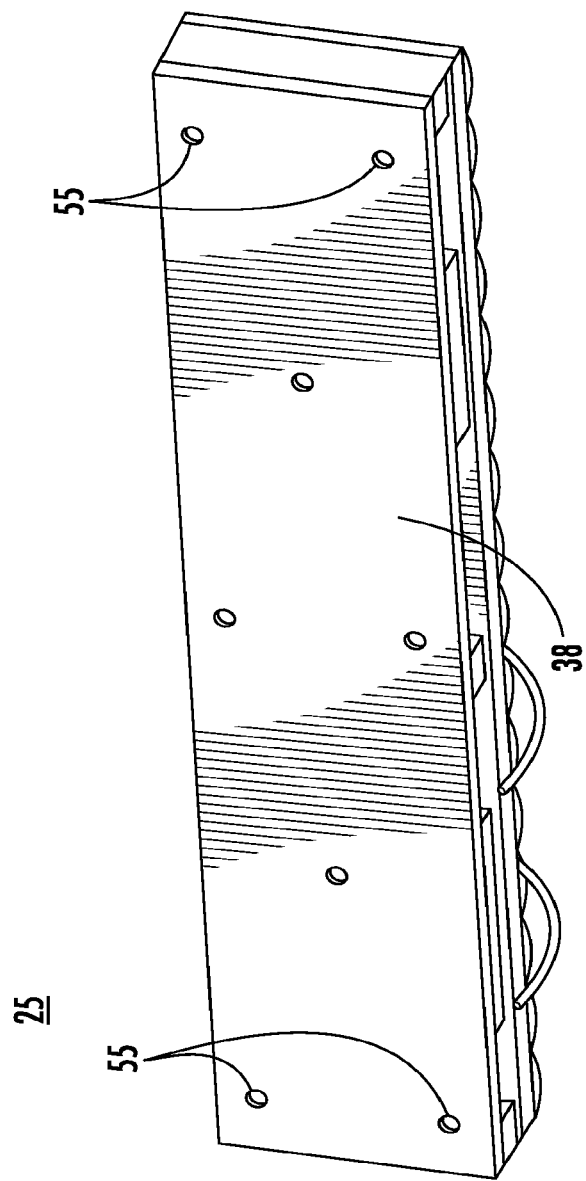
FIG. 9 is a schematic diagram of an underside of a forearm support assembly of the tilting rehabilitation table.

FIG. 9 is a view of the underside of the forearm support assembly 25. Underside surface 38 of forearm support 25 has a plurality of low friction studs 55. Low friction studs 55 are preferably made of TEFLON®.

Figure 10:
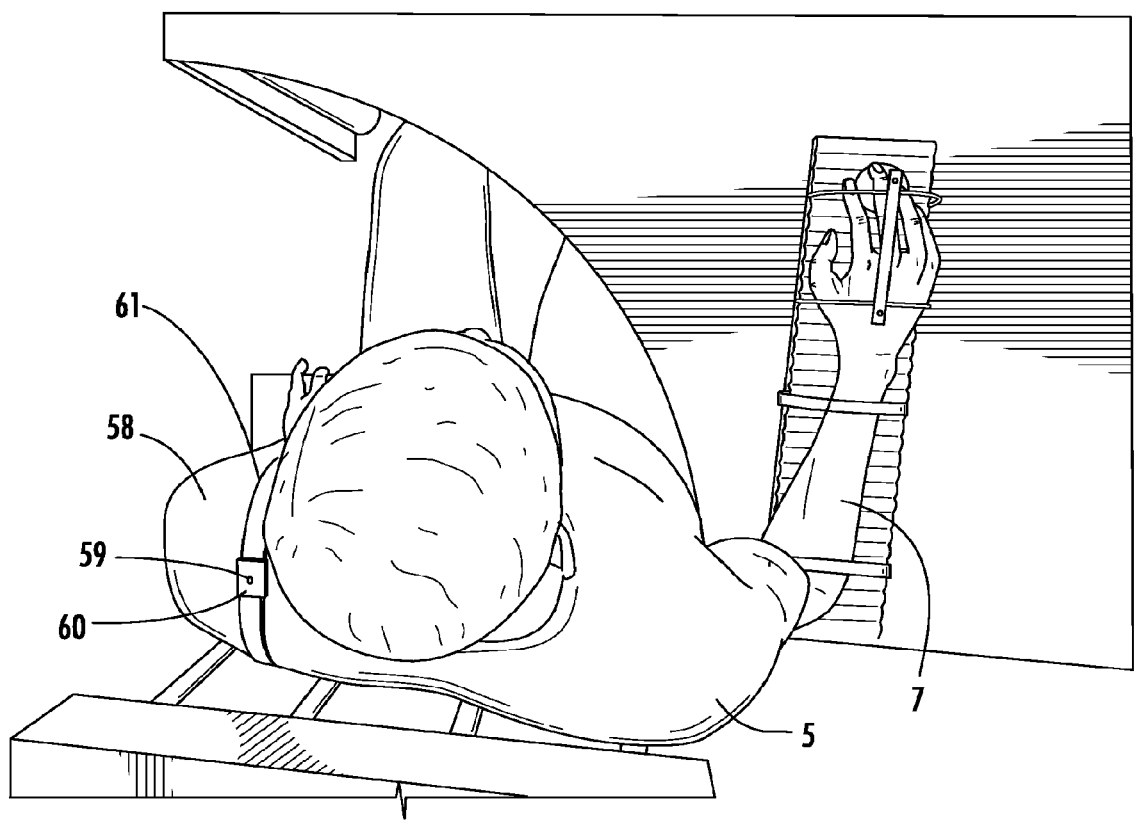
FIG. 10 is a view of the patient wearing a shoulder harness assembly used in the tilting rehabilitation table system.

FIG. 10 shows shoulder harness assembly 57 worn by patient 5 on shoulder 58 opposite to arm 7 being rehabilitated. Shoulder harness assembly 57 incorporates shoulder LED 59 wired to battery 60. Shoulder LED 59 is an infrared LED for providing data on compensatory movements of patient 5. Harness assembly 57 is formed of adjustable segments 61. Segments 61 are preferably formed of a hook and loop material, such as VELCRO®. Video camera 9 takes images of shoulder LED 59. Tracking software 18 running on computer 16 determines when patient 5 is doing undesirable compensatory leaning movements. Tracking software 18 can be adjusted by a therapist to be more sensitive, or less sensitive to leaning of patient 5.

Figure 11:
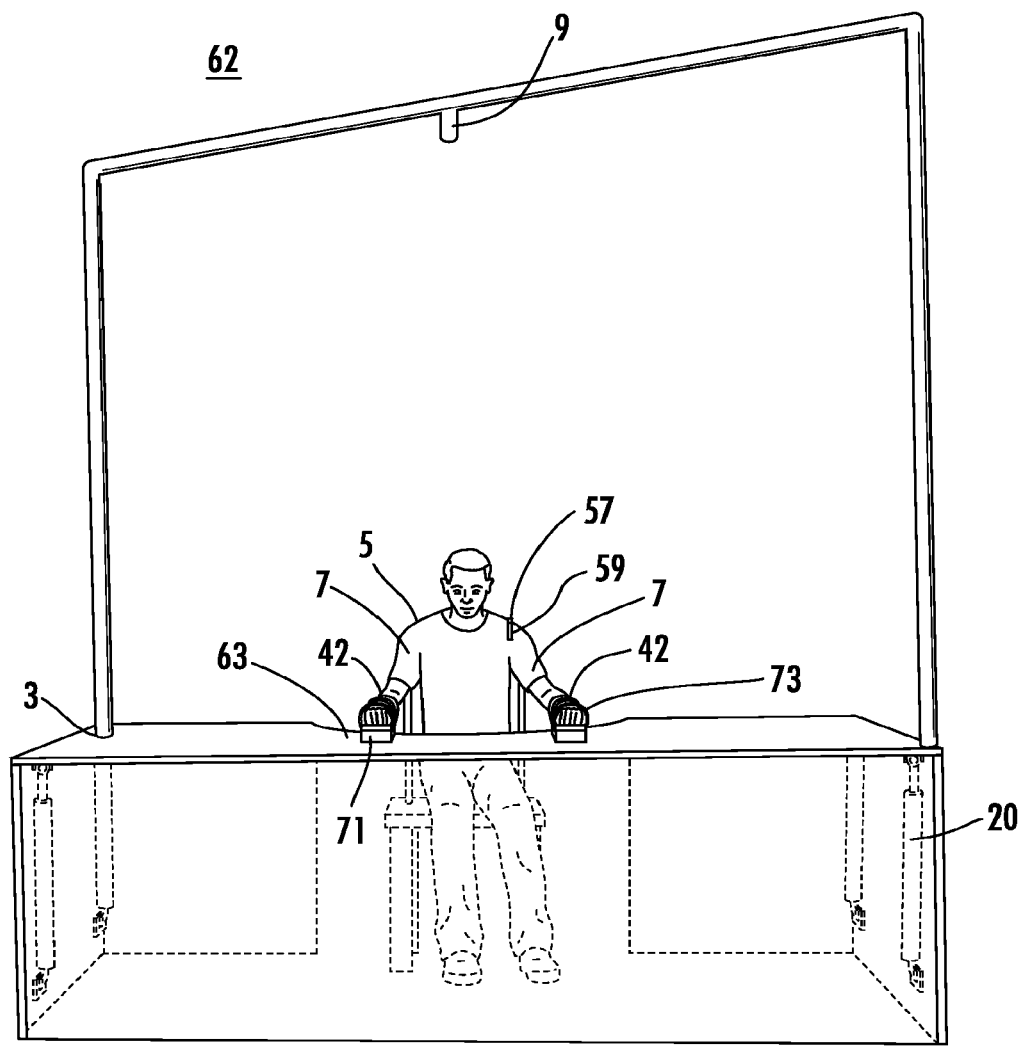
FIG. 11 is a schematic diagram of an alternate embodiment of the tilting table.

FIG. 11 illustrates an alternate embodiment of tilting table 62 for use with two forearm supports 25. Top surface 3 has a U-shape cutout 63 allowing patient 5 to be seated centrally to table axis 64. Patient 5 moves two arms 7 while supported by two low-friction forearm support assemblies 25. This allows training of both arms simultaneously, with benefits to recovery of patient 5. In one embodiment, patient 5 also wears one shoulder harness 57, as it is sufficient to detect the leaning of the shoulder opposite to the disabled arm 7. Video camera 9 views LEDs 42 on both forearm support assemblies 25, as well as LEDs 59 on one shoulder harness assembly 57. Forearm support assembly 25 is modified such that the number of infrared LEDs 42 differs between the two forearm support assemblies 25. For example three LEDs 42 will be on the left-arm forearm support 73, while the right-arm support 71 still has two LEDs 42 as previously described in FIG. 8. This allows tracking software 18 to differentiate between left arm and right arm movements. Tracking software 18 tracks two arms 7 in real time. Data from tracking software 18 is used by computer 16 to run two-arm exercise simulation 17. In this embodiment, the same type of actuators 20 as shown in FIG. 5, can be used in this embodiment. Preferably, four actuators 20 are used in this embodiment.

Figure 12:
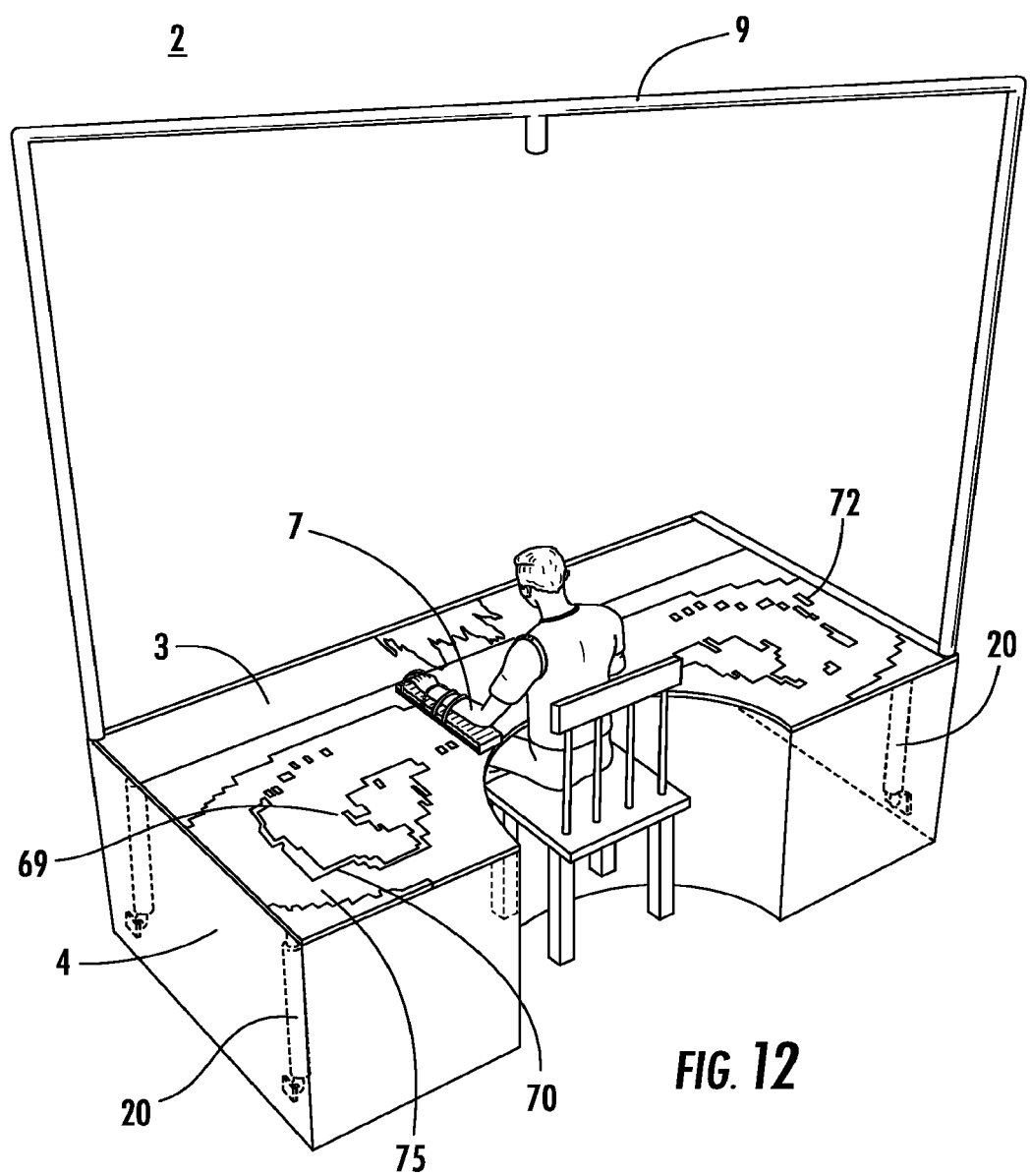
FIG. 12 is a schematic diagram of an alternate embodiment of the tilting table where top surface is a display.

FIG. 12 illustrates an alternate embodiment of tilting table 2. In this embodiment, top surface 3 is also display 69. For example, display 69 can be similar to commercially available thin organic LED (OLED) displays. In this embodiment, the tracking of forearm 7 may be performed by infrared camera 9, or through a touch-sensitive layer 70 incorporated in display 69. In this case the display 69 is a touch sensitive screen such as those available commercially. In case overhead camera 9 is used, forearm support assembly 25 is modified as shown in FIG. 11. Actuator assembly 20 can be connected to frame 72 bordering display 69 and to supporting surface 4. A low-friction transparent film 75 can be retrofitted to display 69, to prevent scratching by the forearm support assemblies 71 and 73 that sit on it.

Figure 13:
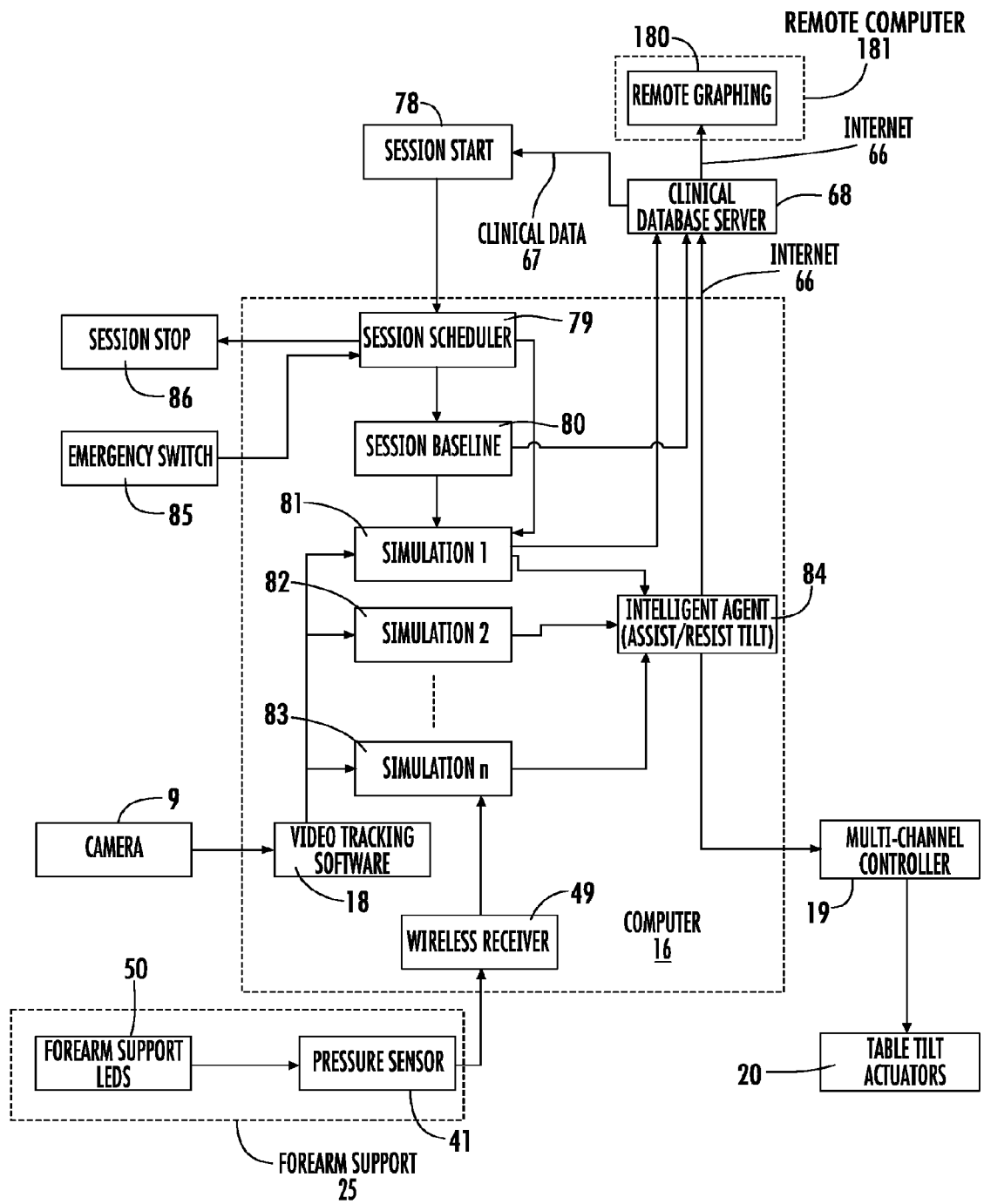
FIG. 13 is a system block diagram for the tilting rehabilitation table system.

A system block diagram for the tilting rehabilitation table system 1 is illustrated in FIG. 13. Each rehabilitation session starts with session start block 78. Session start block 78 loads the patient's ID and other clinical data 67 for arm 7 to be rehabilitated. Session start block 78 transfers control to the session scheduler block 79 which sets the structure of a rehabilitation session, for example, number, type and order of exercises, as well as the difficulty level settings. Session scheduler block 79 is structured such that it applies a customized treatment depending on progress of patient 5 (the order of the particular session being done out of the prescribed number of sessions). Session scheduler block 79 begins by starting session baseline 80 which measures the performance of patient 5 in that day. Session baseline 80 is stored transparently by clinical database server 68 and can be used to track progress of patient 5 over the sequence of rehabilitation sessions. Patient 5 progress can be graphed using remote graphing application 180 running on remote computer 181. It is envisioned that remote computer 181 communicates with clinical database server over Internet 66. Session baseline 80 is also used to fine-tune the "gains" of exercise simulation blocks 81, 82 and 83, such that in virtual reality movements are amplified and success assured even for very limited real arm 7 movements. Exercise simulation blocks 81, 82 and 83 can perform exercise simulation 17. Intelligent agent block 84 monitors the patient progress and can automatically vary tilt angle 15 to assist/resist movement. Intelligent agent block 84 can control actuators 20 through their controller 19 connected to computer 16 running exercise simulation blocks 81, 82 and 83. Actuators 20 provide data to exercise simulation blocks 81, 82 and 83 such that virtual table (not shown) in the scene mimics tilt of tilting table 2. Video camera 9 detects the position of LEDs 50 at the top of forearm support assembly 25 and sends the information to tracking software 18 run by computer 16. Tracking software 18 extracts arm position information and body leaning information and transmits this data to exercise simulation blocks 81, 82 and 83. This data is then used to animate in real time an avatar of the patient's hand(s) (not shown). Manual emergency switch 85, when pressed by attending therapist and/or patient 5 triggers an end to the rehabilitation session through software block 86.

Figure 14:
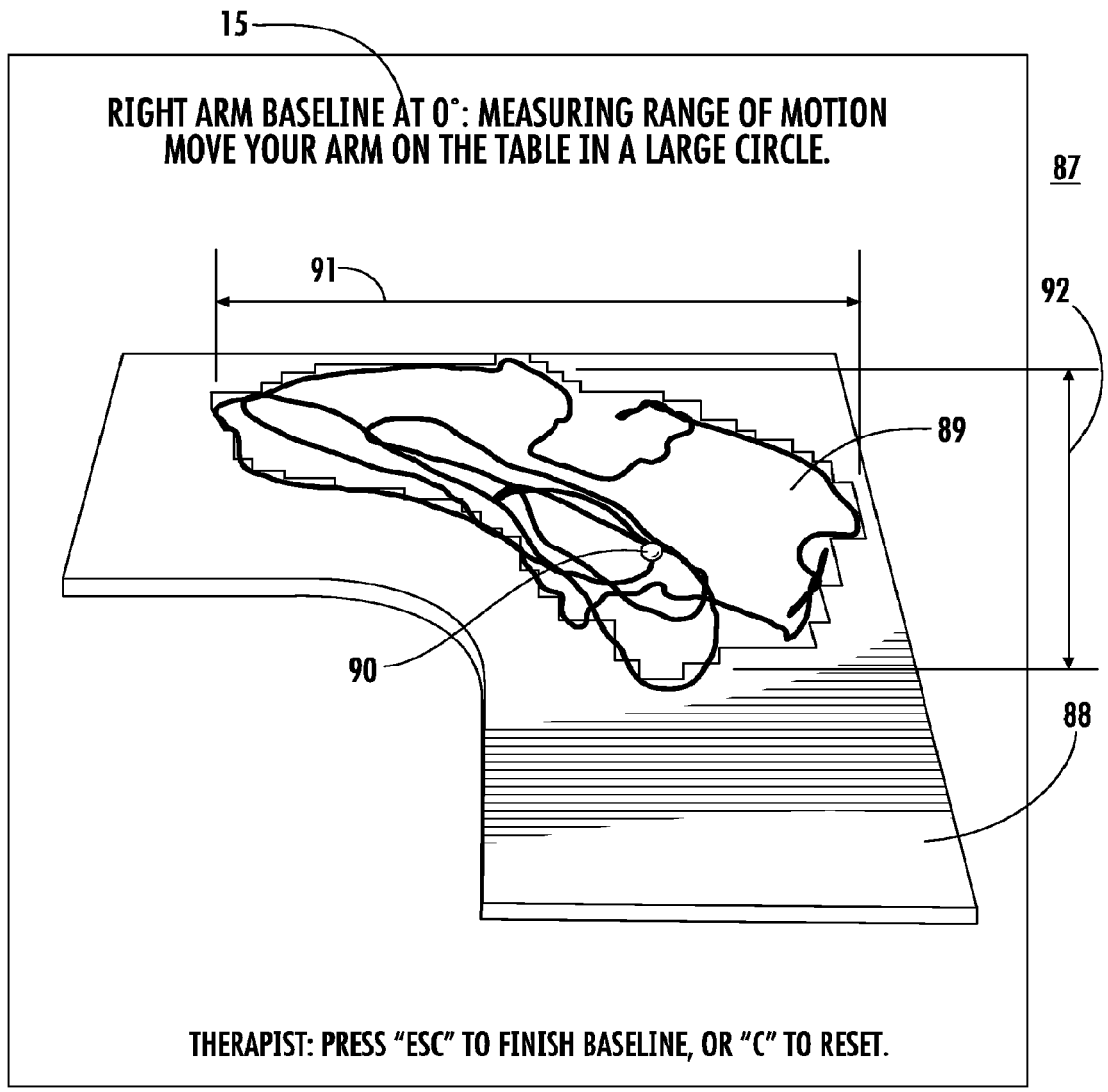
FIG. 14 is a schematic diagram of a patient baseline screen displayed by the tilting rehabilitation table system.

FIG. 14 illustrates an example of patient baseline screen 87 displayed in display 8 or on display 69. Patient 5 is asked to move the arm 7 in large circles to color virtual representation 88 of the rehabilitation table surface 3. The surface of colored area 89 increases with the movement of virtual sphere 90 which responds to the movements of forearm support assembly 25. Size and shape of colored area 89 are a measure of the ability of patient 5 that day. Extent of movement 91 in the left/right (horizontal) direction and extent of movement 92 in the in/out direction are used to adjust the rehabilitation exercise simulation blocks 81, 82 and 83. Baseline screen 87 also shows tilt angle 15 at which baseline 80 was taken.

Figure 15A:
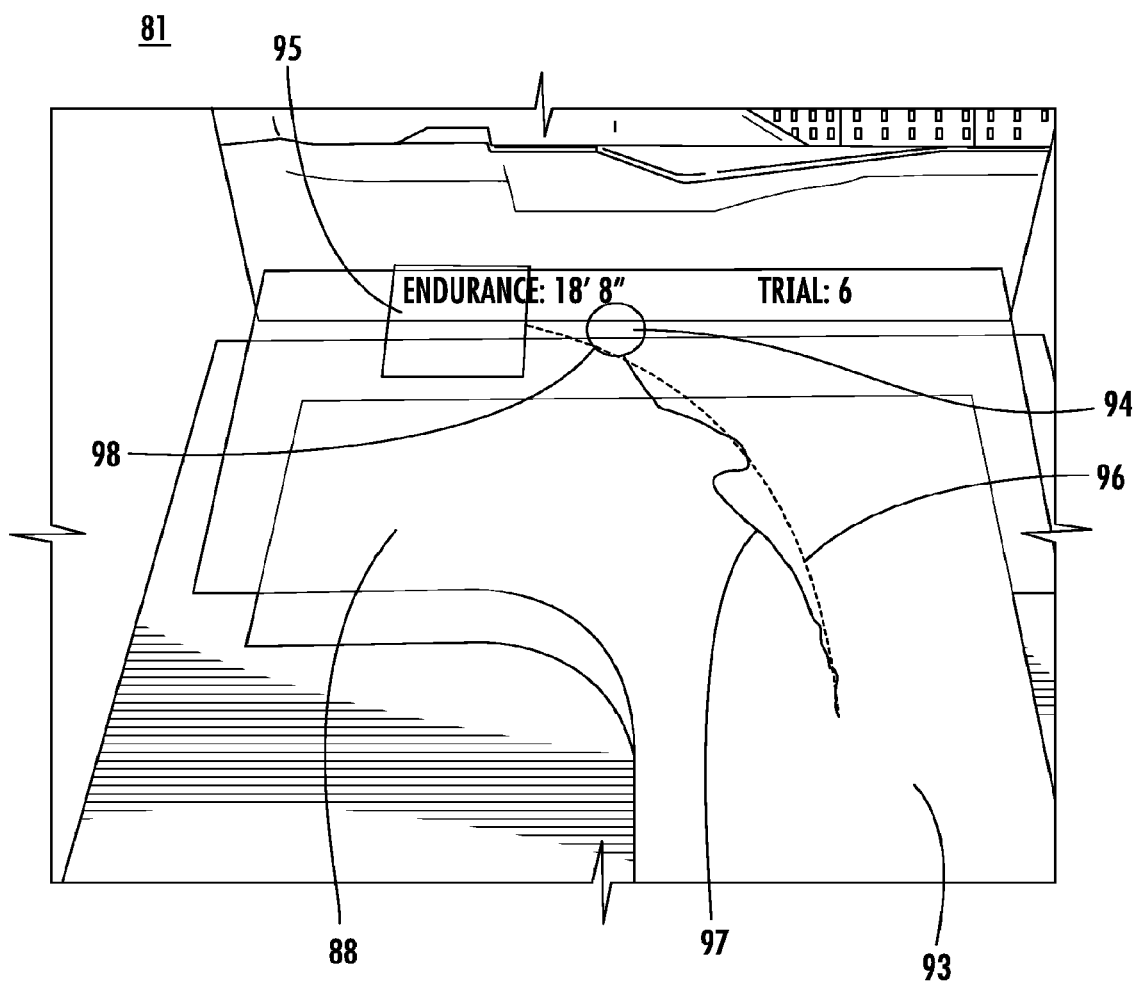
FIG. 15A is a schematic diagram of a virtual scene displayed by the tilting rehabilitation table system.

FIG. 15A shows an embodiment of rehabilitation exercise simulation block 81 with a virtual world representation having tilted table avatar 88. Virtual sphere 94 is shown on table surface 93 together with a virtual target rectangle 95. An ideal path between virtual sphere 94 and virtual target rectangle 95 is visualized by path shown as dotted line 96. The placement of virtual target rectangle 95 and virtual sphere 94 on table surface 88 is such that it requires patient 5 to move arm 7 close to extent of movement 91 and extent of movement 92 of baseline 87. Patient 5 is asked to pick up virtual sphere 94 with a semi-transparent hand avatar 98 and place it in virtual target rectangle area 95. In order to grasp virtual sphere 94, transparent hand avatar 98 has to overlap virtual sphere 94 and patient 5 squeezes compliant element 44 on forearm support assembly 25, as shown in FIG. 1. Real movement of patient 5 is tracked by video camera 9 and computer 16 shows a corresponding trace 97 on table surface 88.

Figure 15B:
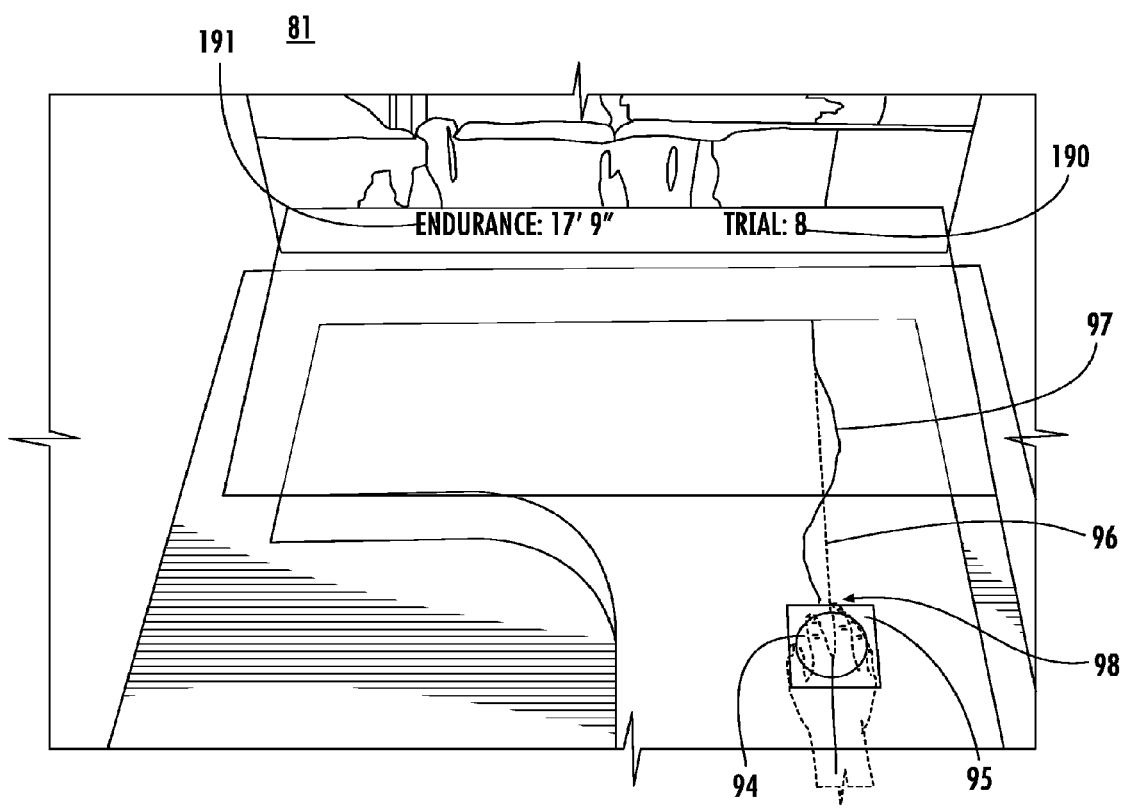
FIG. 15B is a schematic diagram of a virtual scene displayed by the tilting rehabilitation table system.

FIG. 15B shows an alternate embodiment of exercise simulation block 81 of the pick-and-place exercise in which ideal path 96 shown as a straight dotted line. This corresponds to in/out movements of arm 7. This process is repeated a number of times, with the trial (repetition) number 190 and the total arm movement (endurance) 191 corresponding to these repetitions being displayed in simulation 81. Other placements of virtual target rectangle 95 and virtual sphere 94 can be used with corresponding ideal path specifications 96. The difficulty exercise simulation block 81 such as a pick-and-place exercise, is varied by making virtual target rectangle 95 smaller and by requiring patient 5 to make more pick-and-place movements. For patient 5 capable of exerting finger forces 45, difficulty is further increased by elevating the threshold of finger grasping forces 45 detected by the forearm assembly 25 in FIG. 8 at which level corresponding hand avatar 98 can capture virtual sphere 94.

Figure 15C:
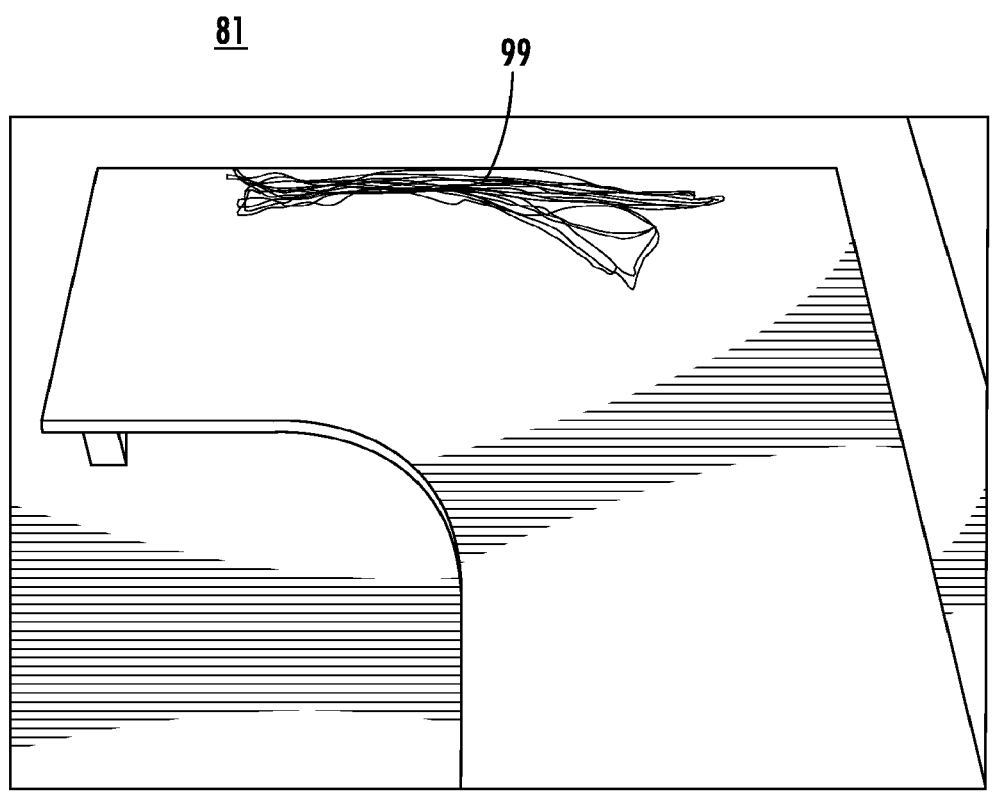
FIG. 15C is a schematic diagram of a virtual scene displayed by the tilting rehabilitation table system.

FIG. 15C shows bundle of traces 99 displayed by exercise simulation block 81 at the end of exercises after a number of pick-and-place movements were completed. In this embodiment, bundle of traces 99 corresponds to repeated pick-and-place movements of arm 7 in the left-right-left direction. The tightness of bundle of traces 99 is indicative of the motor control abilities that day for patient 5.

Figure 16A:
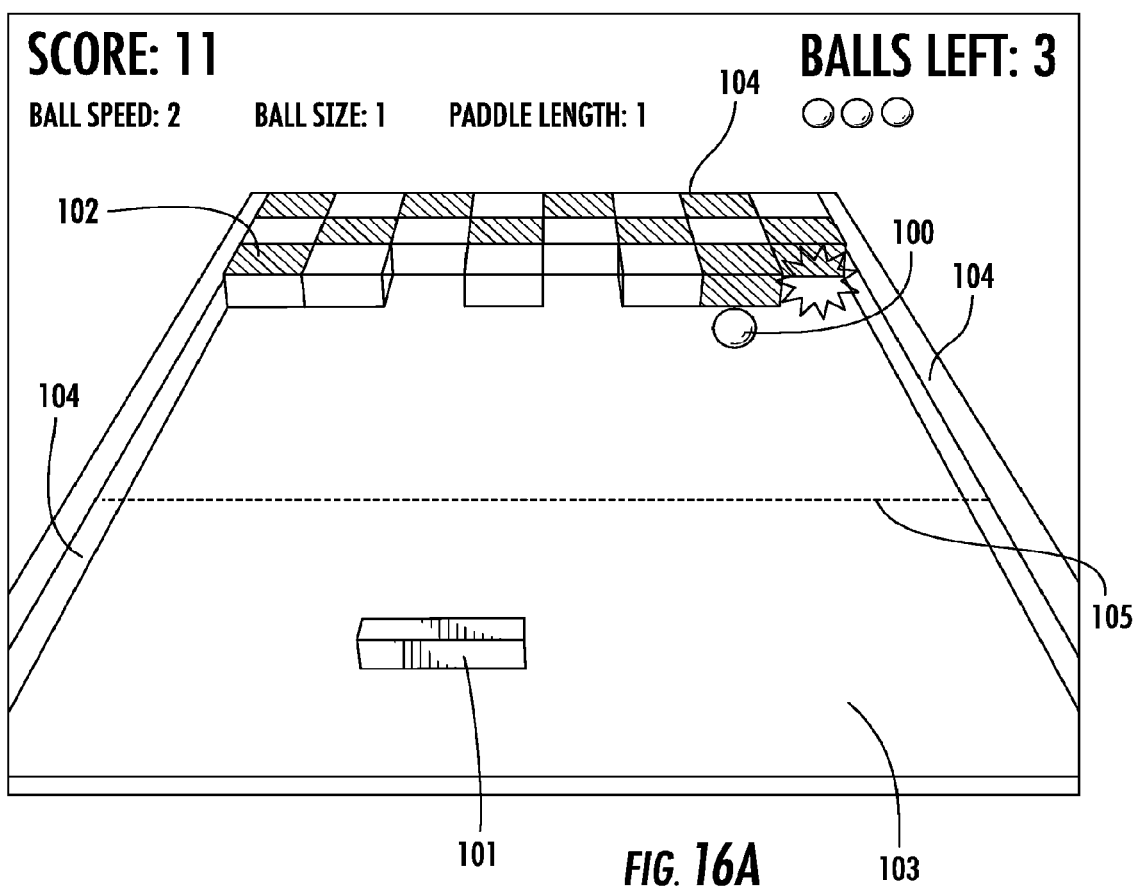
FIG. 16A is a schematic diagram of a virtual scene displayed by the tilting rehabilitation table system.

FIG. 16A shows an embodiment of exercise simulation block 82 referred to "Breakout 3D". This exercise depicts ball 100, paddle 101, and array of cubes 102, all located on play board 103. Paddle 101 is used to bounce ball 100 towards cubes 102 with one cube being destroyed for each bounce of ball 100 off of paddle 101. Ball 100 can bounce off of three sides 104 of play board 103, or off multiple cubes 102, but is lost if it misses paddle 101. In an alternate embodiment, paddle 101 can move mostly left-right, within the lower portion of play board 103, delineated by dashed line 105. The difficulty of exercise simulation block 82 is set by the number of available balls 100, the speed of balls 100, and the size of paddle 101. The higher the speed of ball 100, the smaller the size of paddle 101, and the fewer the number of available balls 100, the harder the Breakout 3D of exercise simulation block 82 game is. The goal of the Breakout 3D exercise simulation block 82 is to destroy all cubes 102 with the available number of balls 100. The Breakout 3D of exercise simulation block 82 is designed to improve hand-eye coordination and cognitive anticipatory strategies of patient 5.

Figure 16B:
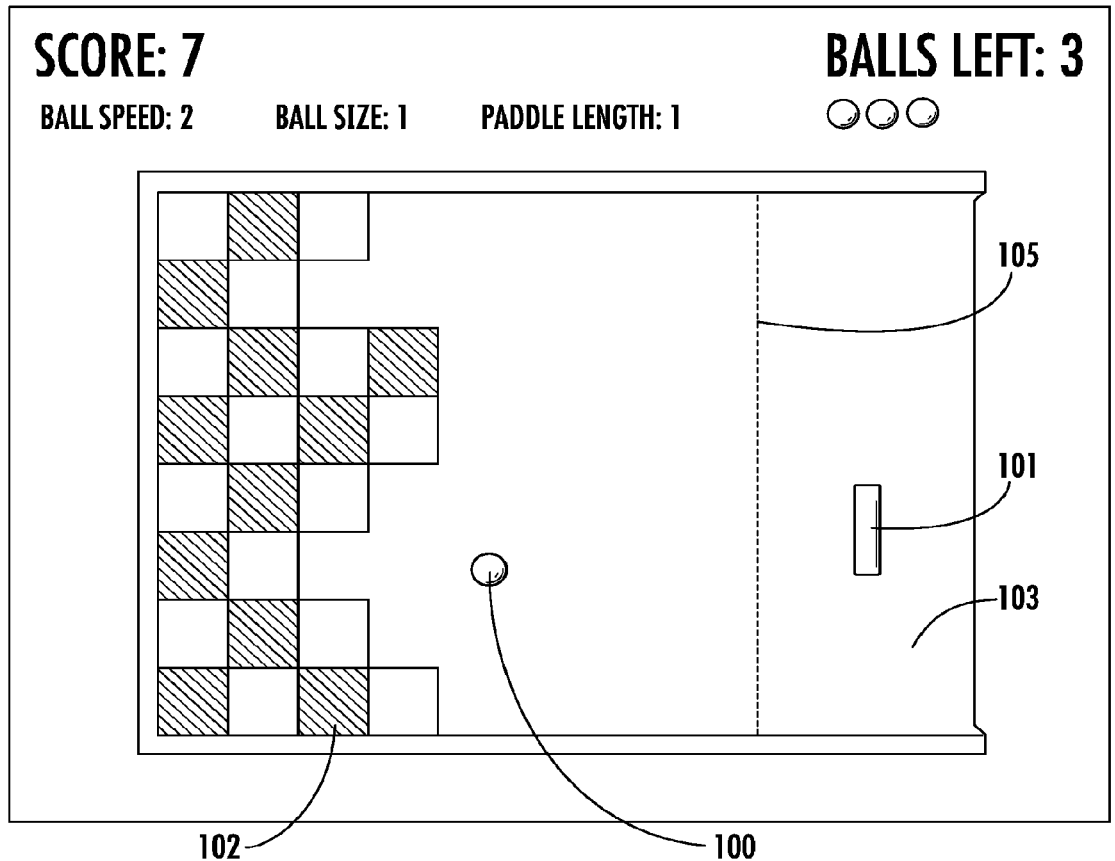
FIG. 16B is a schematic diagram of a virtual scene displayed by the tilting rehabilitation table system.

FIG. 16B is another embodiment of the Breakout 3D of exercise simulation block 82, in which board 103 is rotated to show array of cubes 102 to one side of the scene. In this example paddle 101 moves mostly vertically in the scene, within the area to the right of dotted line 105, requiring corresponding in-out-in movements of arm 7.

Figure 17:
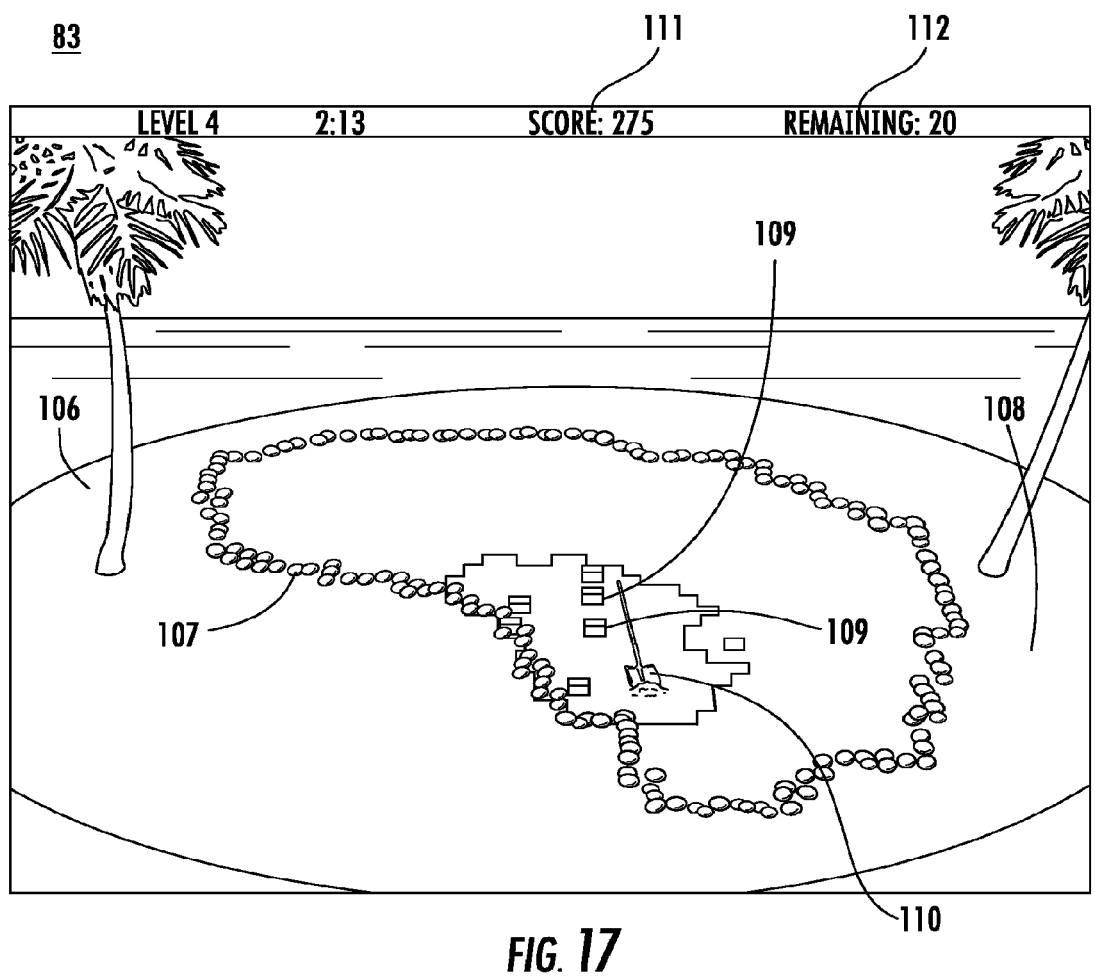
FIG. 17 is a schematic diagram of a virtual scene displayed by the tilting rehabilitation table system.

FIG. 17 is an embodiment of exercise simulation block 83 called "Treasure Hunt". The scene depicts deserted island 106 with line of stones 107 on top of virtual sand 108. The shape of line of stones 107 replicates the shape of baseline surface colored area 89. There are a number of virtual treasures chests 109 inside sand 108 surrounded by line of stones 107. Patient 5 controls virtual shovel 110 with which to remove sand 108 covering treasure chests 109. Every time a new treasure chest 109 is found score 111 displayed in the scene is increased. In order to find a new treasure chest 109 shovel 110 has to be moved in sand 108 that overlaps treasure chest 109. If tracking software 18 detects leaning of patient 5 treasure chest 109 is not revealed even if shovel 110 is in the correct position and score 111 is not increased. At higher level of difficulty, a sand storm occurs. Part of the already uncovered treasure chests 109 are covered again by sand 108 requiring more movement of arm 7 of patient 5 arm 7 to uncover treasure chest 109 again. The Treasure Hunt exercise simulation block 83 is timed and remaining time 112 is displayed at the top of the scene. Patient 5 attempts to uncover all of treasure chests 109 in the allowed amount of time 112. This exercise is aimed at increasing arm endurance of patient 5. In other embodiments, other simulation exercises can be played by patient 5.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A system for rehabilitation comprising:
   a low-friction tilting table, said tilting table adapted to be movable at a tilt angle in one or more degrees of freedom;
   a forearm support adapted for receiving a forearm of a user, said forearm support being movable on, but not attached to, a top surface of said tilting table;
   an animated or virtual reality sequence forming an exercise simulation being displayed on a display;
   a hollow compliant element and pressure sensor, said pressure sensor measuring grasping forces of the user when grasping said hollow compliant element; and
   a tracking device for tracking movements of said forearm support upon interaction of said user with said exercise simulation,
   wherein said tracking device comprises a video camera and tracking software for tracking output from said video camera, wherein said tracking device measures movement of the forearm support on top of, but not attached to, the low-friction tilting table and interacts with the exercise simulation;
   wherein said video camera is attached to a vertical support attached to the top surface of the tilting table to provide a same relative orientation of the camera to the tilting table regardless of the tilt angle.

2. The system of claim 1 wherein said tilting table is movable in four degrees of freedom.

3. The system of claim 1 wherein said tilting table has a top surface and said display is part of said top surface of said tilting table.

4. The system of claim 3 further comprising a touch sensitive layer in said display.

5. The system of claim 3 wherein said video camera is positioned beneath said display.

6. The system of claim 1 further comprising:
   one or more actuators connected to said tilting table, said one or more actuators moving said tilting table at said tilt angle.

7. The system of claim 6 wherein said actuators are connected to an underside of a top surface of said tilting table with a top joint assembly, said top joint assembly including a horizontal rotating joint and a vertical rotation joint to produce two degrees of freedom.

8. The system of claim 6 wherein said actuators are connected to an underside of a bottom surface of said tilting table with a bottom joint assembly, said bottom joint assembly including a horizontal rotating joint and a vertical rotation joint to produce two degrees of freedom.

9. The system of claim 1 further comprising:
   one or more LEDs coupled to a respective corner of a top surface of said tilting table for providing calibration of said video camera.

10. The system of claim 9 further comprising:
    a pair of second LEDs positioned on said forearm support for providing data on arm movements and rotation on the too surface of said tilting table.

11. The system of claim 1 further comprising:
    a harness assembly adapted for attachment to a shoulder of a user, an LED being coupled to said harness assembly, said LED providing data on compensatory leaning movements of the user.

12. The system of claim 1 wherein a pair of said forearm supports are used in said system, each said forearm support receiving a respective forearm of the user.

13. The system of claim 12 wherein one or more first LEDs are positioned in a first forearm support of said pair and one or more second LEDs are positioned on a second forearm support of said pair, wherein a number of said first LEDs is different than a number of said second LEDs.

14. The system of claim 1 wherein said animated or virtual reality sequence forming an exercise simulation includes an avatar and further comprising:
    a baseline of said user; and
    a map of said baseline
    wherein said animated or virtual reality sequence forming an exercise is adapted for tuning said exercise simulation and providing mapping between real movement of an arm of said user and movement of said avatar during said animated or virtual reality sequence forming an exercise simulation.

15. The system of claim 14 wherein said exercise simulation includes a virtual representation of a rehabilitation surface, the arm of the user is adapted to move in circles over said virtual rehabilitation surface wherein a corresponding colored area is displayed on said virtual rehabilitation surface.

16. The system of claim 14 wherein said exercise simulation includes a virtual sphere and a virtual target area, the arm of the user picks up the virtual sphere and places it in the virtual target area, and the arm of the user is moved to the extent of the baseline.

17. The system of claim 16 wherein traces of arm movements of the user are displayed in the exercise simulation.

18. The system of claim 14 wherein the exercise simulation includes virtual objects in shape of the baseline, and virtual targets are uncovered by moving the arm of the user.

19. The system of claim 14 wherein the exercise simulation includes:
    a virtual reality array of cubes,
    a virtual reality ball, and
    a virtual reality paddle,
    wherein the user hits the virtual reality ball towards the virtual reality cubes with the virtual reality paddle, and each said virtual reality cube is destroyed for each bounce of said virtual reality ball on said virtual reality cube.

20. A method for rehabilitation comprising the steps of:
    providing a forearm support adapted for receiving a forearm of a user on a tilting table, said tilting table adapted to be movable in one or more degrees of freedom;
    displaying an animated or virtual reality sequence forming an exercise simulation on a display; and
    tracking movements of the forearm interaction with said exercise simulation, wherein the tracking of movements is tracked by video camera, wherein said video camera is attached to a vertical support attached to a too surface of the tilting table to provide a same relative orientation of the camera to the tilting table regardless of the tilt angle of the tilting table.

* * * * *